April 11, 1950     J. T. DAVIDSON ET AL     2,503,805

RECORD MATERIAL EQUIPMENT FOR ACCOUNTING MACHINES

Original Filed March 3, 1944     16 Sheets-Sheet 1

JOHN T. DAVIDSON
JESSE R. GANGER
JAMES H. CRAWFORD &
HERMAN F. SADGEBURY
INVENTORS

BY *Pearl Beust*

THEIR ATTORNEY

JOHN T. DAVIDSON
JESSE R. GANGER
JAMES H. CRAWFORD &
HERMAN F. SADGEBURY
INVENTORS

BY Earl Benst
THEIR ATTORNEY

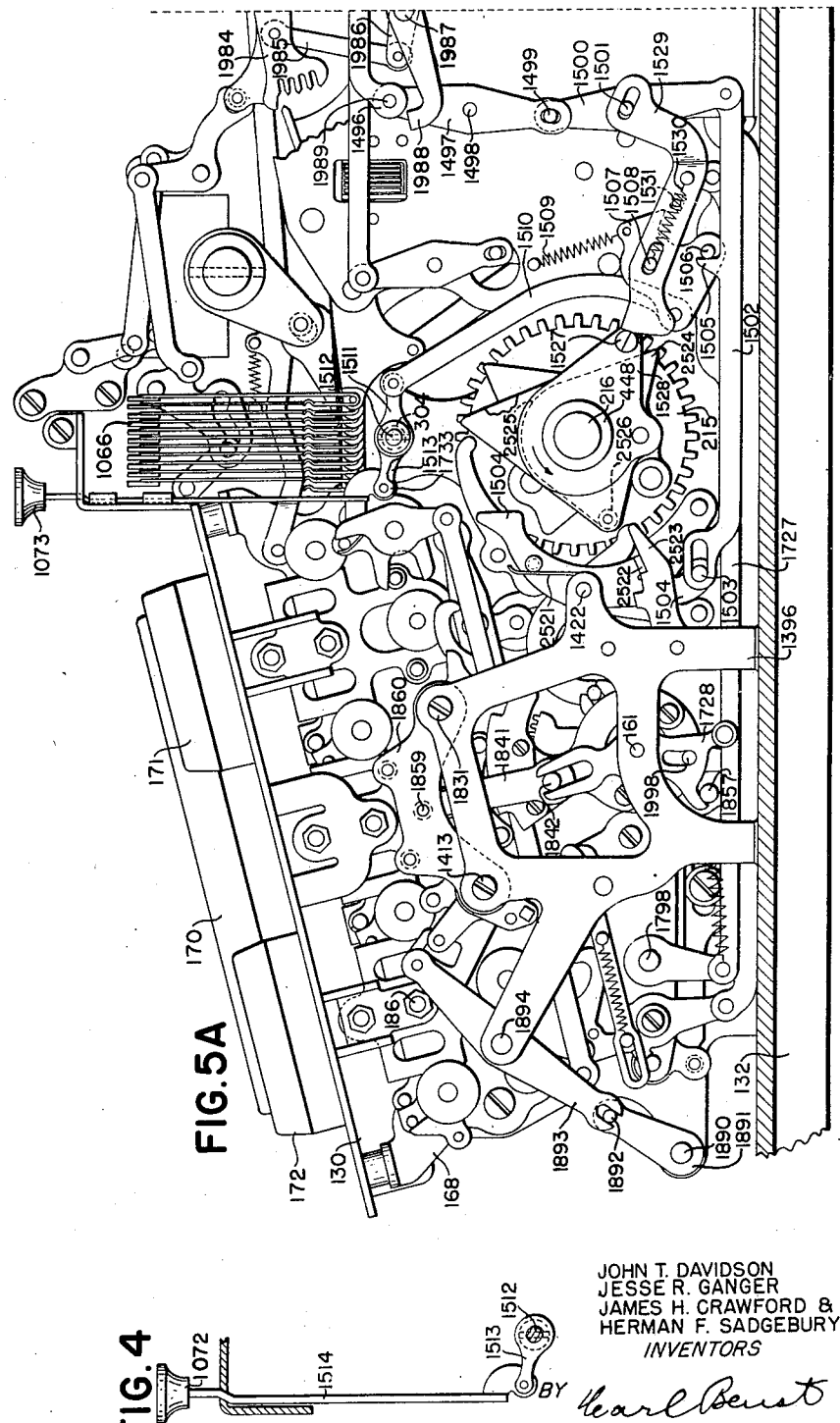

April 11, 1950 J. T. DAVIDSON ET AL 2,503,805
RECORD MATERIAL EQUIPMENT FOR ACCOUNTING MACHINES
Original Filed March 3, 1944 16 Sheets-Sheet 4

JOHN T. DAVIDSON
JESSE R. GANGER
JAMES H. CRAWFORD &
HERMAN F. SADGEBURY
INVENTORS

BY *Pearl Benst*

THEIR ATTORNEY

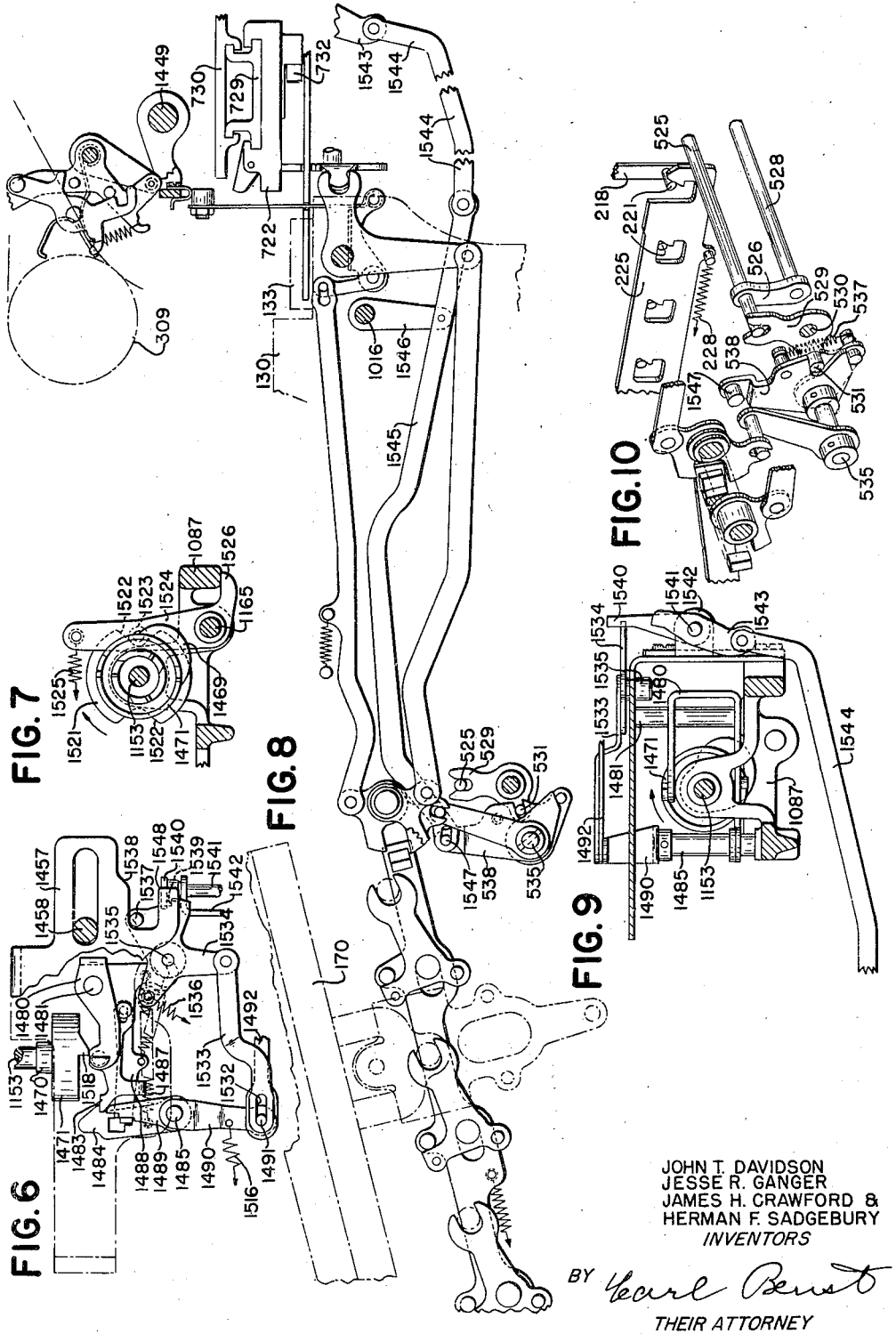

JOHN T. DAVIDSON
JESSE R. GANGER
JAMES H. CRAWFORD &
HERMAN F. SADGEBURY
INVENTORS

BY Earl Benst
THEIR ATTORNEY

April 11, 1950     J. T. DAVIDSON ET AL     2,503,805
RECORD MATERIAL EQUIPMENT FOR ACCOUNTING MACHINES JOHN T. DAVIDSON
JESSE R. GANGER
JAMES H. CRAWFORD &
HERMAN F. SADGEBURY
*INVENTORS*

BY *Pearl Berist*

THEIR ATTORNEY

April 11, 1950　　J. T. DAVIDSON ET AL　　2,503,805
RECORD MATERIAL EQUIPMENT FOR ACCOUNTING MACHINES
Original Filed March 3, 1944　　16 Sheets-Sheet 8

JOHN T. DAVIDSON
JESSE R. GANGER
JAMES H. CRAWFORD &
HERMAN F. SADGEBURY
*INVENTORS*

BY *Pearl Benst*

THEIR ATTORNEY

April 11, 1950     J. T. DAVIDSON ET AL     2,503,805
RECORD MATERIAL EQUIPMENT FOR ACCOUNTING MACHINES
Original Filed March 3, 1944     16 Sheets-Sheet 9
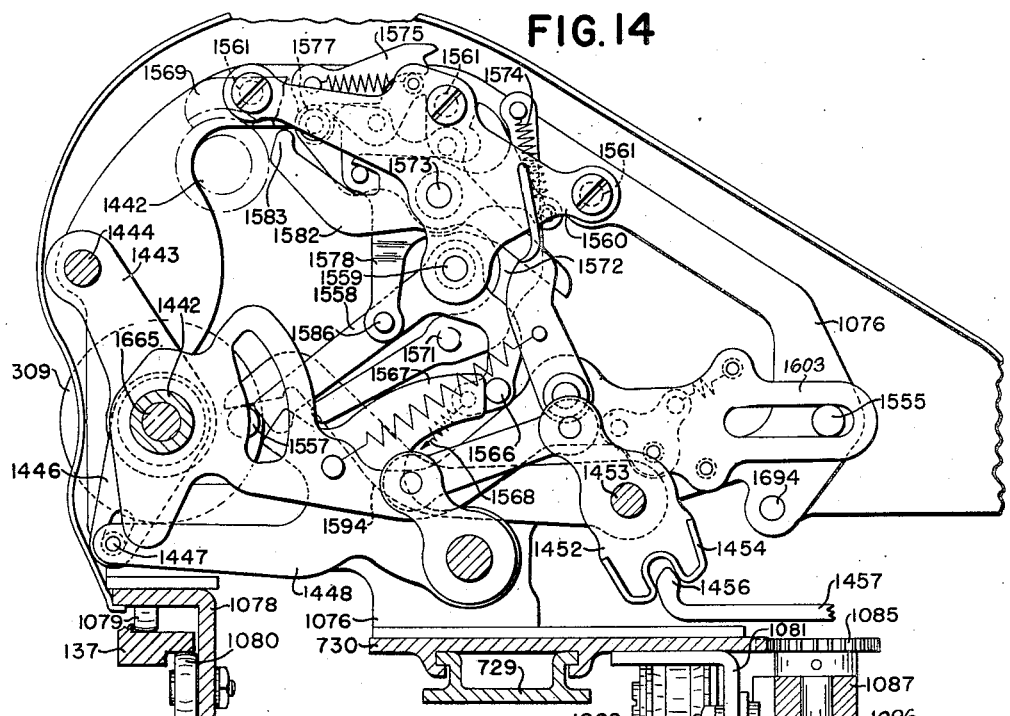
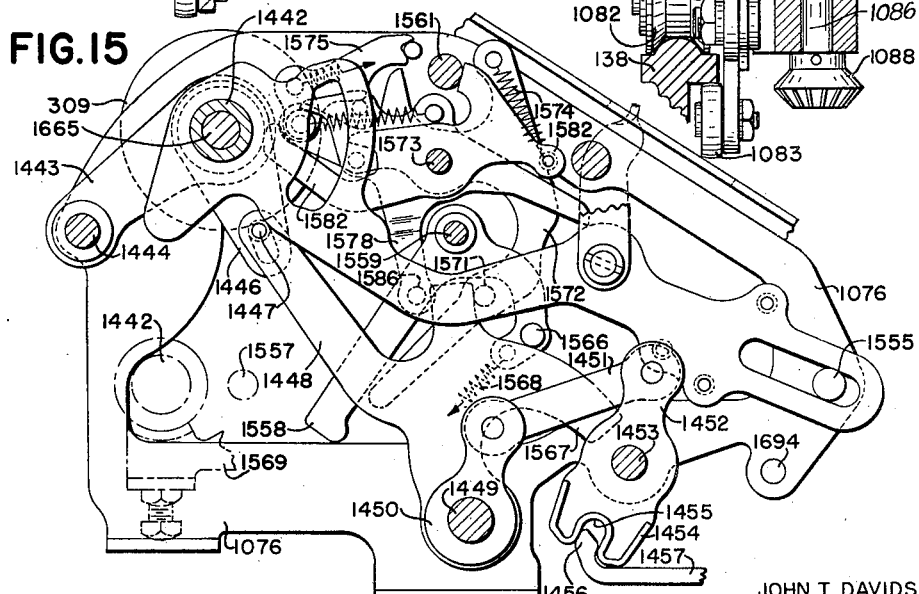
JOHN T. DAVIDSON
JESSE R. GANGER
JAMES H. CRAWFORD &
HERMAN F. SADGEBURY
*INVENTORS*
BY *Earl Beust*
THEIR ATTORNEY April 11, 1950  J. T. DAVIDSON ET AL  2,503,805
RECORD MATERIAL EQUIPMENT FOR ACCOUNTING MACHINES
Original Filed March 3, 1944  16 Sheets-Sheet 10

JOHN T. DAVIDSON
JESSE R. GANGER
JAMES H. CRAWFORD &
HERMAN F. SADGEBURY
INVENTORS

BY *Earl Brust*
THEIR ATTORNEY

April 11, 1950     J. T. DAVIDSON ET AL     2,503,805
RECORD MATERIAL EQUIPMENT FOR ACCOUNTING MACHINES
Original Filed March 3, 1944     16 Sheets—Sheet 11
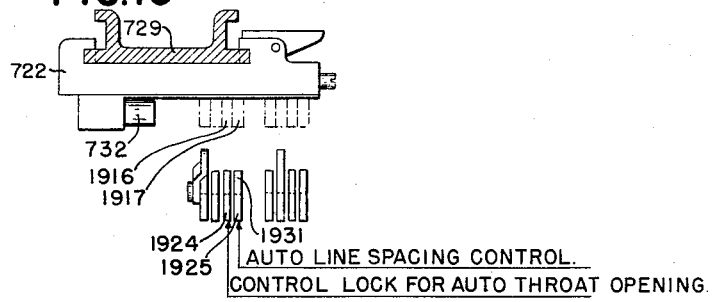
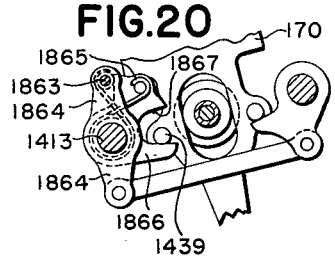
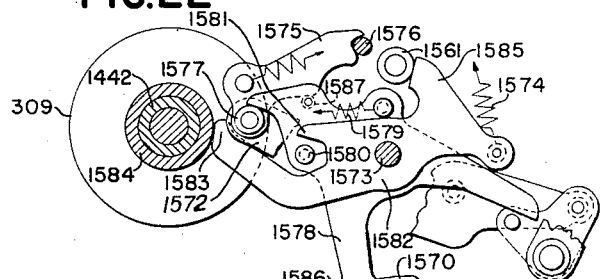
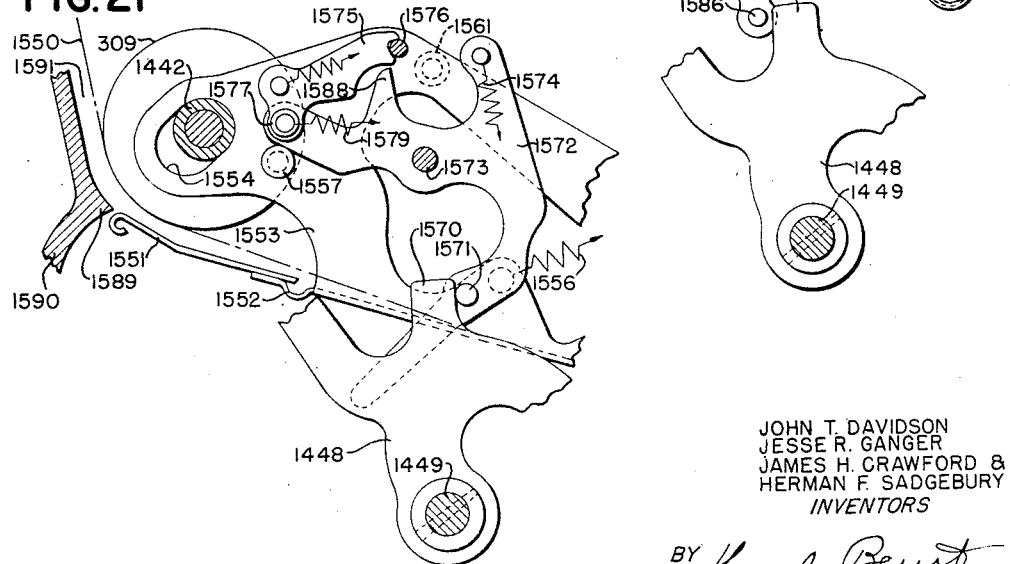
JOHN T. DAVIDSON
JESSE R. GANGER
JAMES H. CRAWFORD &
HERMAN F. SADGEBURY
INVENTORS
BY Earl Beust
THEIR ATTORNEY April 11, 1950  J. T. DAVIDSON ET AL  2,503,805
RECORD MATERIAL EQUIPMENT FOR ACCOUNTING MACHINES
Original Filed March 3, 1944  16 Sheets-Sheet 12
FIG. 23
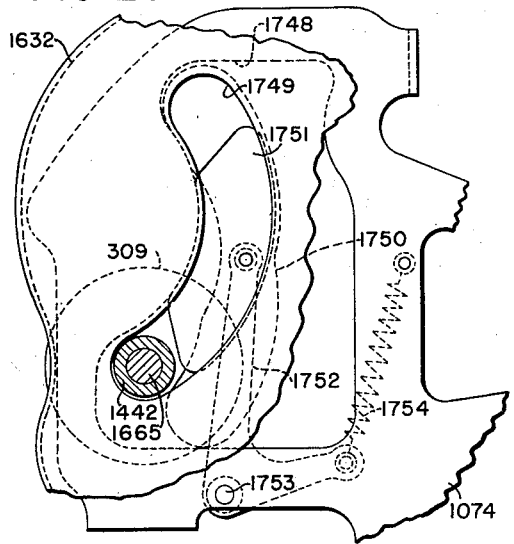
FIG. 24
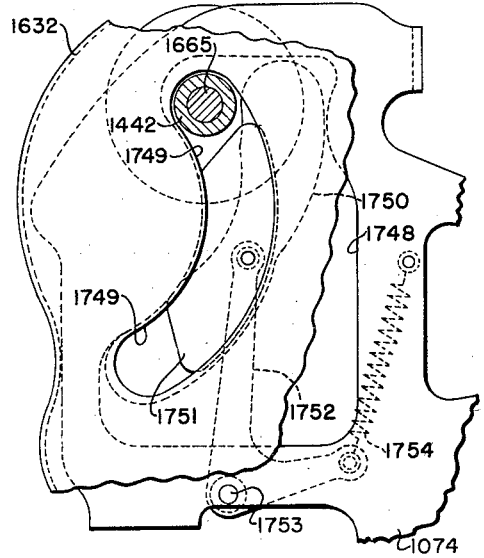
FIG. 25
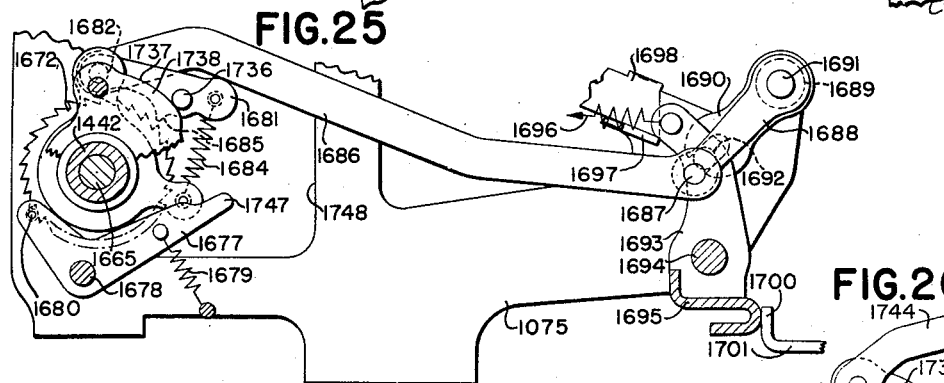
FIG. 26
FIG. 27
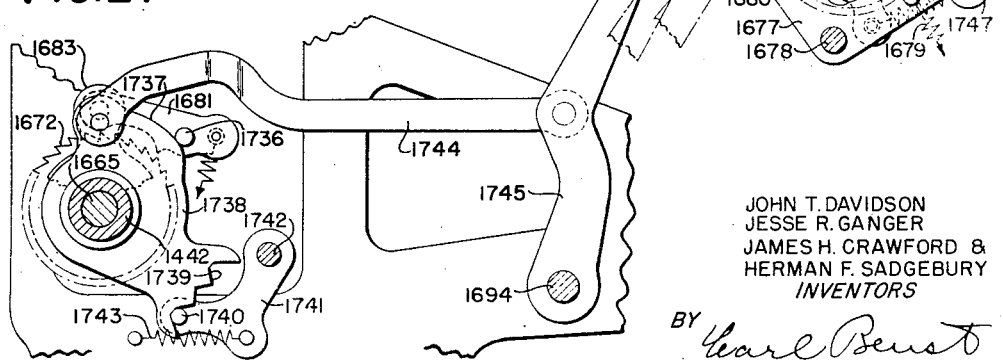
JOHN T. DAVIDSON
JESSE R. GANGER
JAMES H. CRAWFORD &
HERMAN F. SADGEBURY
INVENTORS
BY Earl Benst
THEIR ATTORNEY April 11, 1950  J. T. DAVIDSON ET AL  2,503,805
RECORD MATERIAL EQUIPMENT FOR ACCOUNTING MACHINES
Original Filed March 3, 1944  16 Sheets-Sheet 13

JOHN T. DAVIDSON
JESSE R. GANGER
JAMES H. CRAWFORD &
HERMAN F. SADGEBURY
INVENTORS

BY Earl Beust
THEIR ATTORNEY

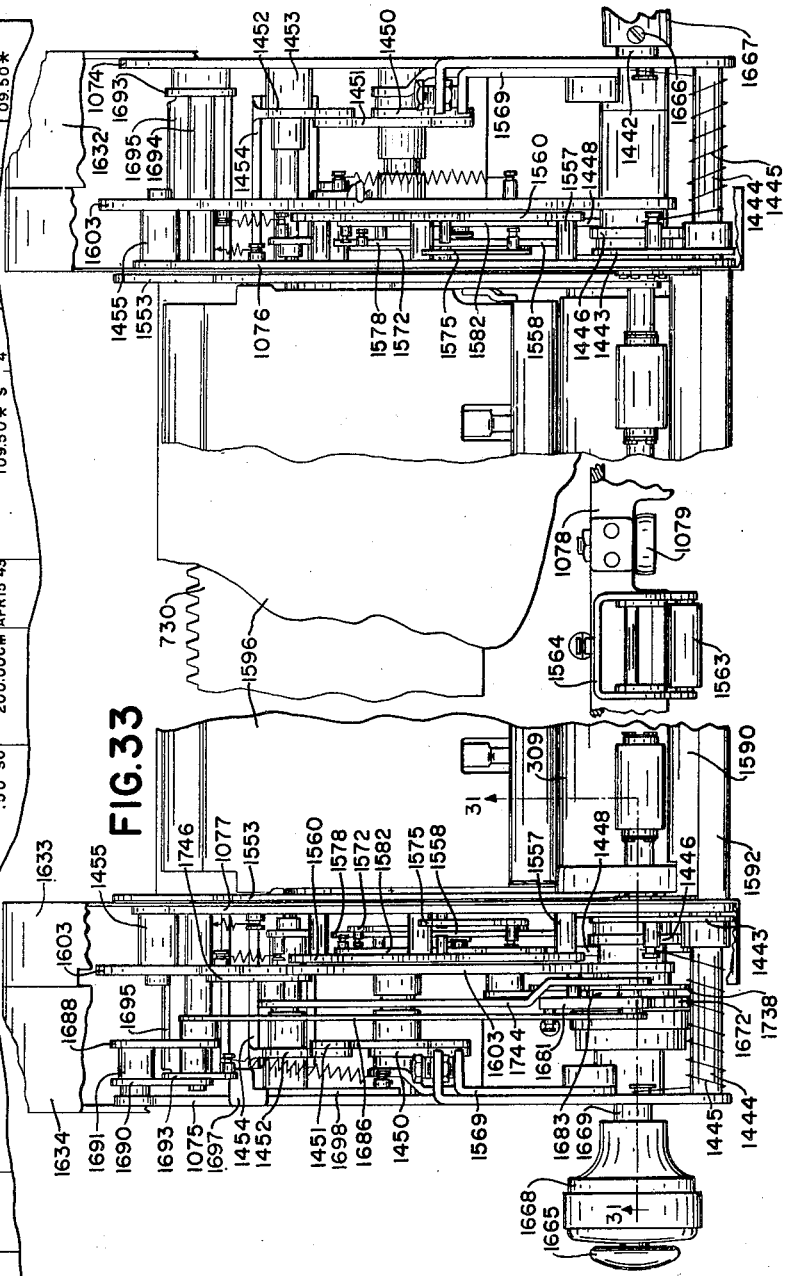

April 11, 1950    J. T. DAVIDSON ET AL    2,503,805
RECORD MATERIAL EQUIPMENT FOR ACCOUNTING MACHINES
Original Filed March 3, 1944    16 Sheets-Sheet 15

JOHN T. DAVIDSON
JESSE R. GANGER
JAMES H. CRAWFORD &
HERMAN F. SADGEBURY
INVENTORS

BY Carl Beust
THEIR ATTORNEY

April 11, 1950 J. T. DAVIDSON ET AL 2,503,805
RECORD MATERIAL EQUIPMENT FOR ACCOUNTING MACHINES
Original Filed March 3, 1944 16 Sheets-Sheet 16
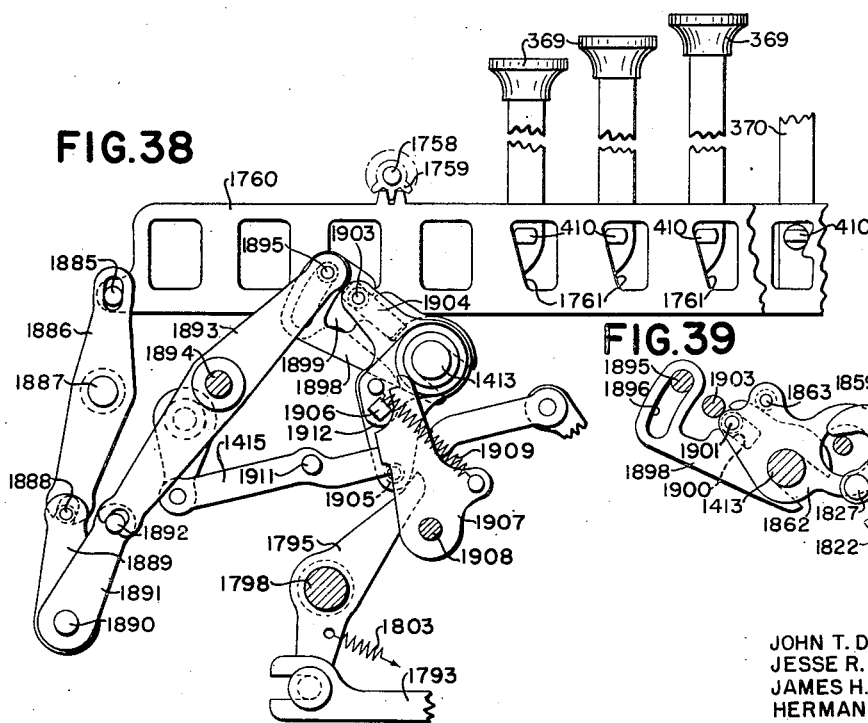
JOHN T. DAVIDSON
JESSE R. GANGER
JAMES H. CRAWFORD &
HERMAN F. SADGEBURY
INVENTORS
BY Pearl Beust
THEIR ATTORNEY Patented Apr. 11, 1950

2,503,805

UNITED STATES PATENT OFFICE 2,503,805

RECORD MATERIAL EQUIPMENT FOR ACCOUNTING MACHINES

John T. Davidson, Jesse R. Ganger, James H. Crawford, and Herman F. Sadgebury, Dayton, Ohio, assignors to The National Cash Register Company, Dayton, Ohio, a corporation of Maryland Original application March 3, 1944, Serial No. 524,846. Divided and this application December 21, 1945, Serial No. 636,356

9 Claims. (Cl. 197—128)

This application is a division of the application of John T. Davidson et al., Serial No. 524,846, filed March 3, 1944, and since issued as Patent No. 2,442,402, dated June 1, 1948.

The present invention is directed to improvements in accounting or bookkeeping machines and the like and is particularly directed to improvements in the traveling carriage mechanisms of such machines.

Speaking more specifically, the present invention is directed to an improved type of accounting or bookkeeping machine for use in connection with the many complex business systems employed by modern business establishments in the keeping of accurate and permanent records of all the transactions in which they participate.

The particular machine chosen to illustrate the present invention is arranged for use by banking establishments in connection with the accounting or bookkeeping problems involved in the balancing of individual checking accounts. However, it is not the desire to limit the features of this invention to any particular machine or to any particular business system, as the versatility and the flexibility of such a machine admirably adapt it for use in the solution of practically all accounting problems encountered in connection with complex present-day business systems.

Many of the basic principles of the machine embodying this invention are disclosed in the following United States patents: Letters Patent of the United States Nos. 1,197,278 and 1,203,863, issued, respectively, September 5, 1916, and November 7, 1916, to Halcolm Ellis; No. 1,819,084, issued August 18, 1931, to Emil John Ens; No. 2,038,717, issued April 28, 1936, to Raymond A. Christian; No. 2,079,355, issued May 4, 1937, to Charles L. Lee; No. 2,181,975, issued December 5, 1939, to Charles L. Lee; No. 2,189,851, issued February 13, 1940, to Paul H. Williams et al.; and No. 2,217,221, issued October 8, 1940, to Jesse R. Ganger. Reference may be had to the above patents for the details of construction of the basic portions of the machine, which are described herein only in a general way.

One object of the present invention is to provide an accounting machine for use in connection with the complex business systems of present-day business establishments with an improved type of front-feed traveling carriage having hydraulic means for driving said carriage in tabulating and return directions, said hydraulic means operating independently of the operating means for the machine proper.

Another object is to provide a front-feed traveling carriage with improved means for moving its platen roll from working position to front feeding position and vice versa, and to provide novel means for controlling said moving means.

Still another object is to supply novel means for rotating the platen roll to line-space the record material and to provide means for actuating and controlling said rotating means.

A further object is the provision of a selectively controlled device for controlling the line-spacing movement of the platen roll.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 4 is a detail view of the key for controlling the opening and closing of the front-feed throat.

Figure 5B:
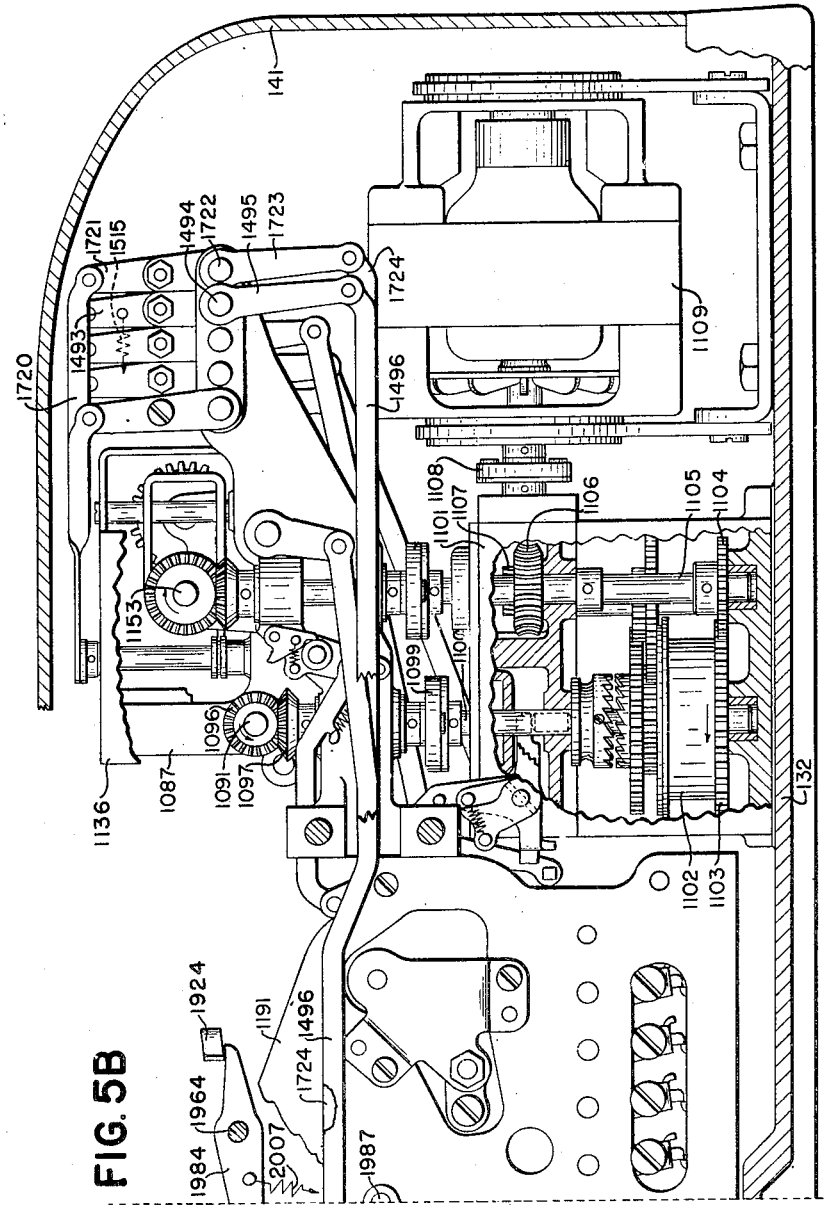

Figs. 5-A and 5-B together constitute a side elevation of the machine as observed from its right-hand side.

Fig. 6 is a detail view of the clutch mechanism for controlling the opening and closing of the front-feed throat.

Fig. 7 is a detail view of the homing or disengaging mechanism for the clutch mechanism shown in Fig. 6.

Fig. 8 is a right side elevation showing in particular the mechanism for locking the machine releasing mechanism against operation.

Fig. 9 is a detail view of a portion of the mechanism for causing the front-feed throat to be closed when an amount key is depressed.

Fig. 10 is a perspective view showing in detail the mechanism for locking the machine against operation when an amount key is partially depressed and for closing the front-feed throat when an amount key or an item counting key is depressed.

Figure 11:
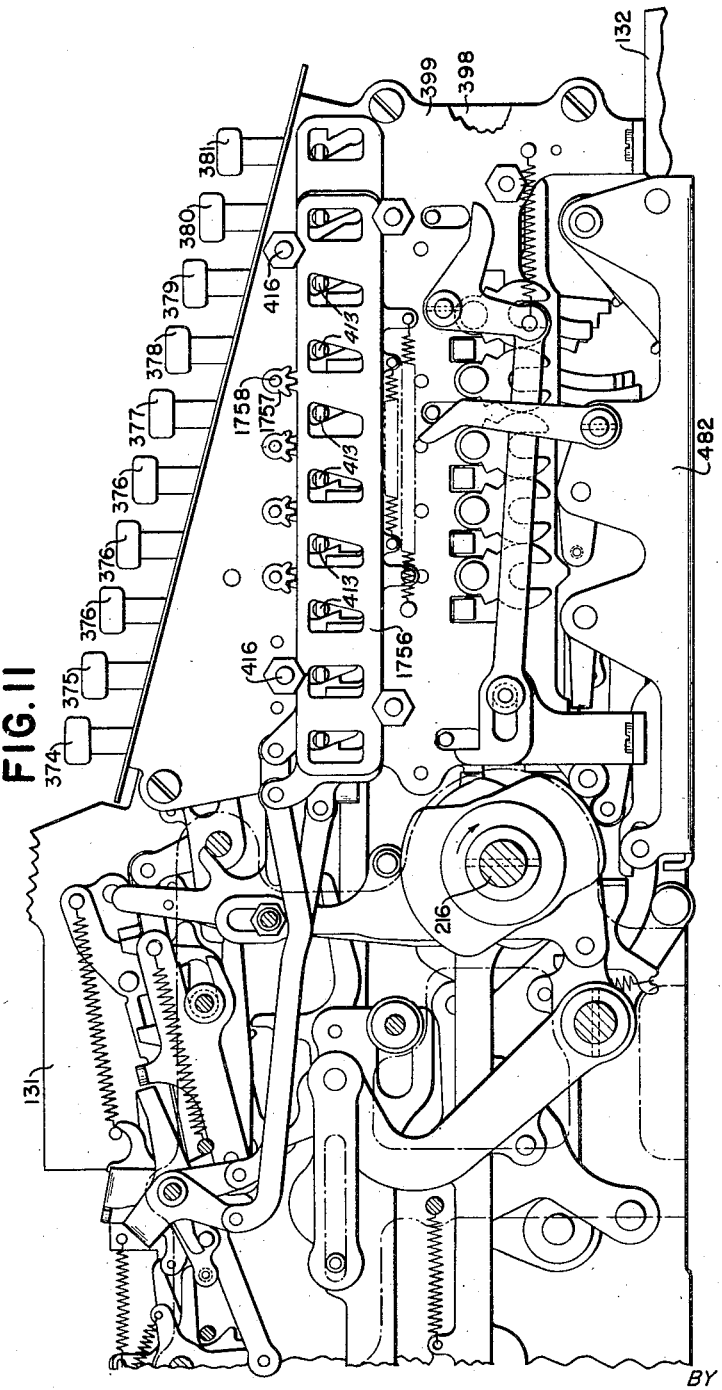

Fig. 11 is a side elevation of the front portion of the machine as observed from the left, showing in particular a portion of the mechanism for controlling the functions of the various totalizers.

Figure 12A:
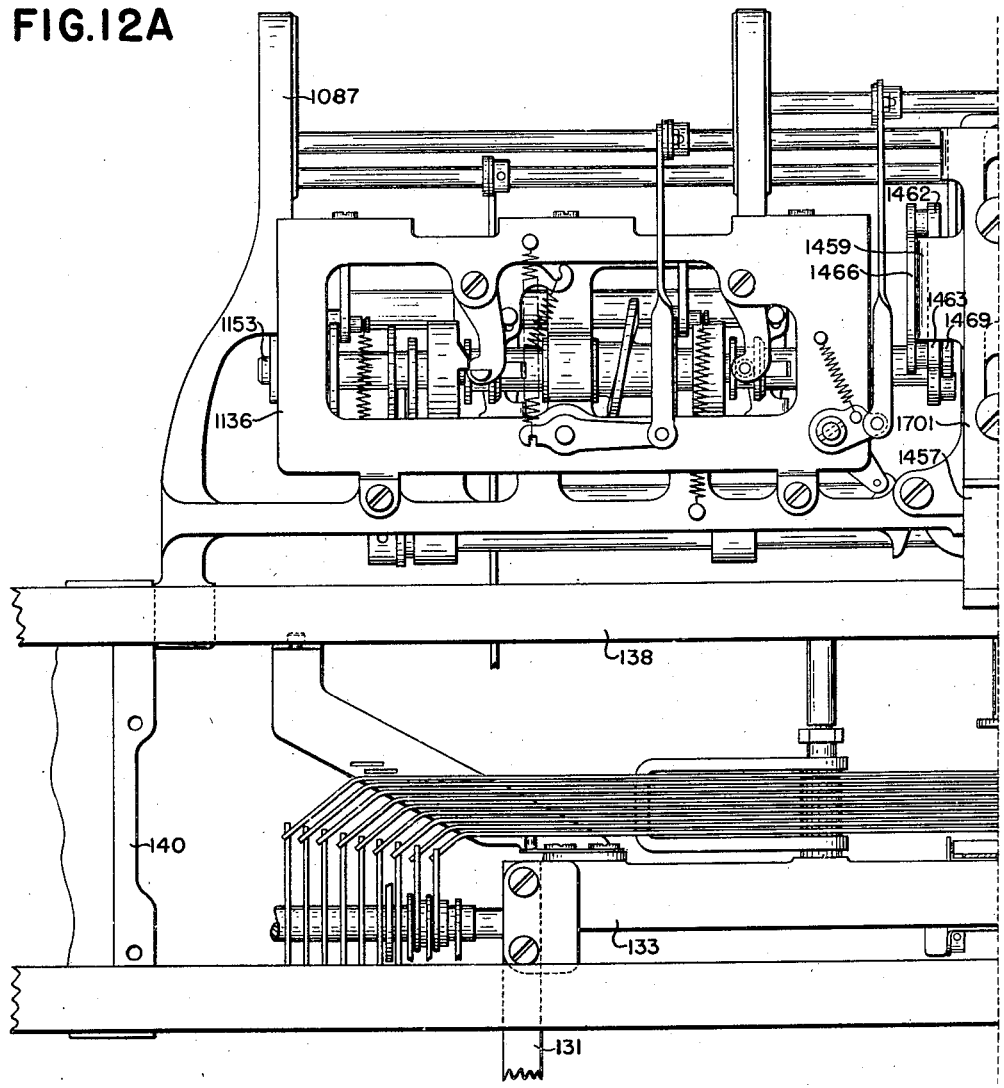
Figure 12B:
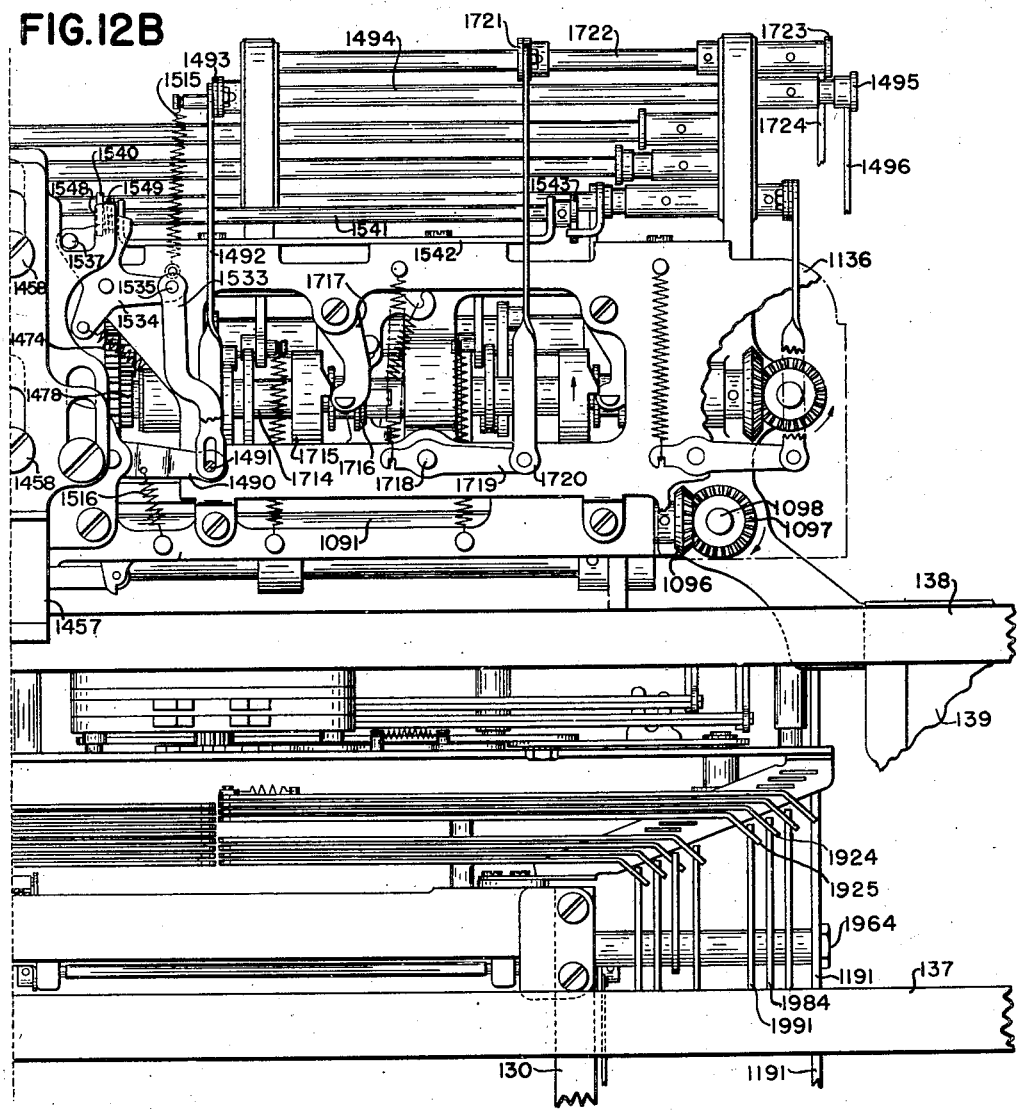

Figs. 12-A and 12-B together constitute a top plan view of the operating mechanism for the traveling carriage and of the sensing mechanism controlled by control blocks mounted in columnar positions on said carriage, for controlling the various functions of the machine.

Figure 13:
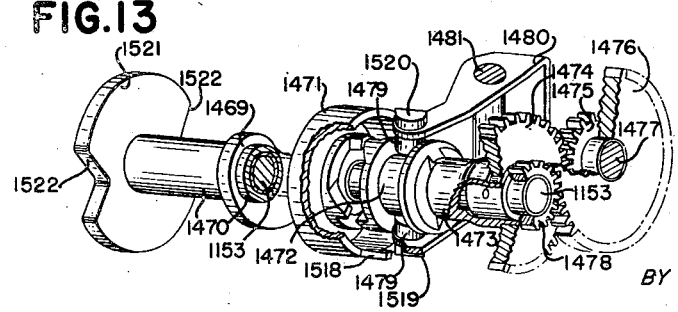

Fig. 13 is a perspective view of the clutch and the gearing associated therewith for moving the traveling carriage platen roll from printing position to front feeding position and vice versa.

Fig. 14 is a right end view of the traveling carriage with the right cover plate removed to better show the mechanism for shifting the platen roll from printing position to front feeding position and vice versa, said mechanism being shown in printing position.

Fig. 15 is a right end view showing the relative positions of the parts of Fig. 14, when the platen roll is in front-feed position.

Figure 16:
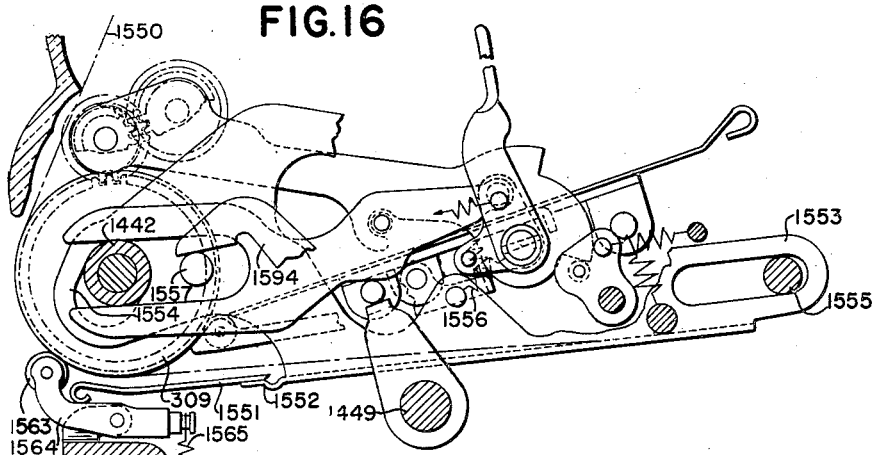

Fig. 16 is a right end view of the traveling carriage showing in particular the upper and lower pressure rollers for the record material in effective position.

Figure 17:
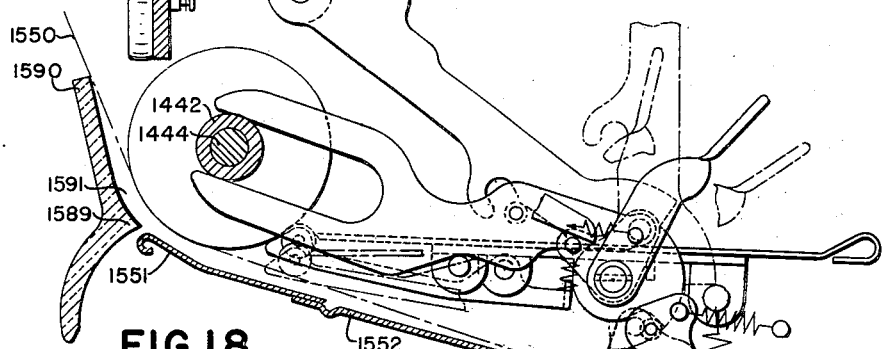

Fig. 17 shows a portion of the mechanism of Fig. 16 and shows in particular how the upper and lower pressure rollers are disengaged from the platen roll through the medium of a manipulative lever to facilitate the insertion of a journal sheet.

Figure 18:
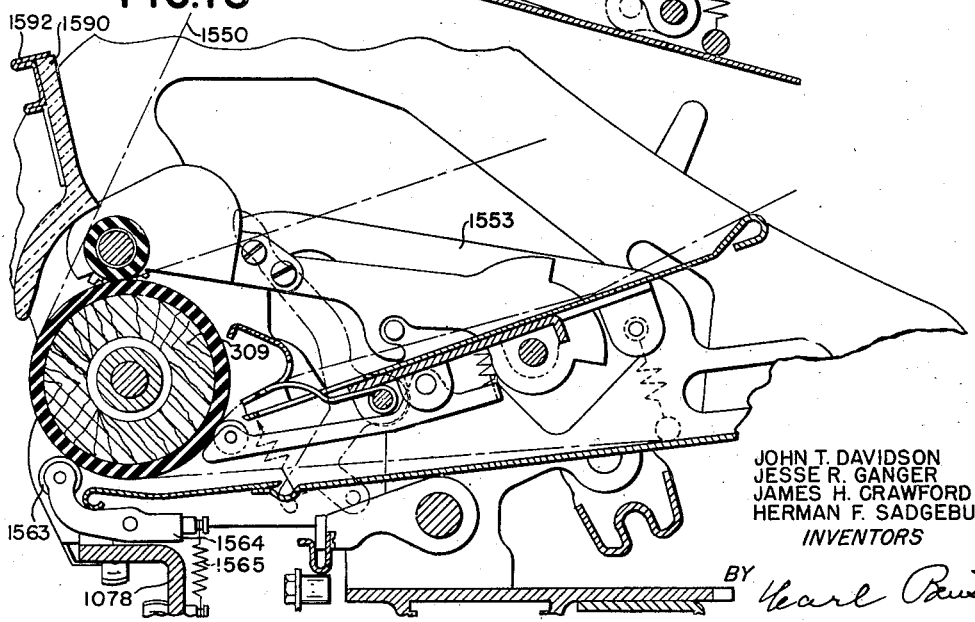

Fig. 18 is a cross-sectional view of the traveling carriage, showing in detail certain of its important parts.

Fig. 19 is a cross-sectional view of a portion of the mechanism for controlling various functions of the machine by means of the traveling carriage in selected columnar positions thereof.

Fig. 20 is a detail view of a portion of the mechanism for controlling the tabulation of the traveling carriage by means of one of the release bars.

Fig. 21 is a detail view of a portion of the mechanism shown in Figs. 14 and 15.

Fig. 22 is a detail view of another portion of the mechanism shown in Figs. 14 and 15.

Figs. 23 and 24 show in detail the mechanism for covering the slots in the end plates through which the platen roll shaft extends.

Fig. 25 is a detail view of the mechanism for automatically rotating the platen roll to line-space or vertical-feed the record material.

Fig. 26 is a detail view of the feed pawl and the feed retaining pawl for the line-spacing mechanism.

Fig. 27 is a detail view of the manipulative lever and associated mechanism for controlling the extent of movement of the line-spacing mechanism.

Figure 28:
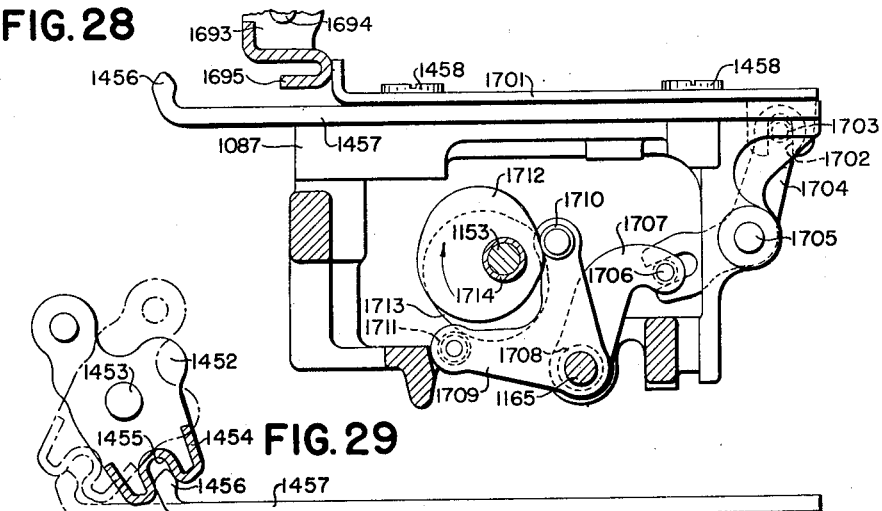

Fig. 28 is a detail view of the cams and associated mechanism for operating the line-spacing or vertical feeding mechanism.

Figure 29:
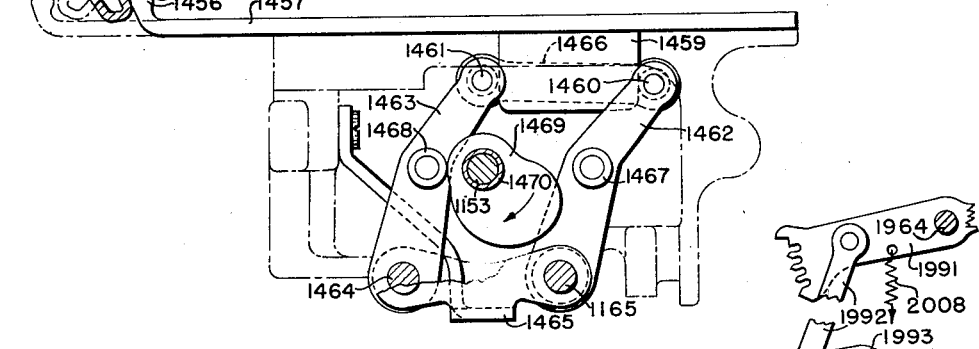

Fig. 29 is a detail view of the cams and associated mechanism for operating the throat-opening mechanism.

Figure 30:
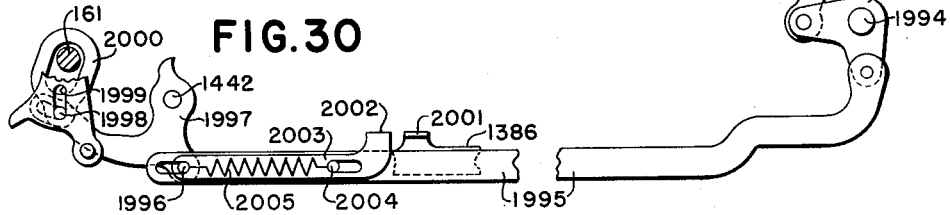

Fig. 30 is a side elevation of a portion of the mechanism controlled by the traveling carriage in columnar positions thereof and by one of the machine release bars, for controlling the line-spacing function of the platen roll.

Figure 31:
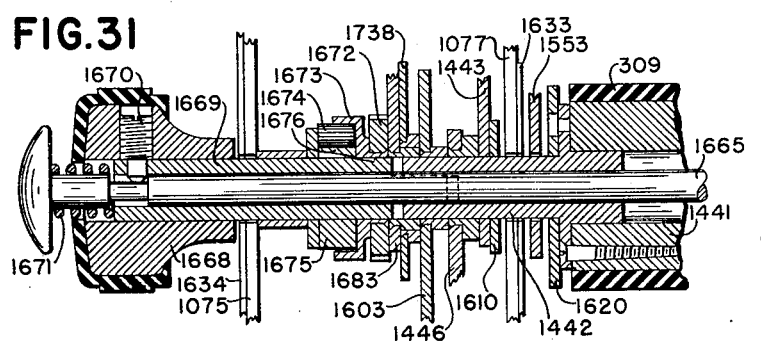

Fig. 31 is a cross-sectional view of the left-hand end of the platen roll taken along line 31—31 (Fig. 33) looking in the direction indicated by the arrows.

Fig. 32 is a facsimile of a fragmentary portion of a statement slip illustrating one use of the machine of this invention.

Fig. 33 is a fragmentary plan view of the traveling carriage.

Figure 34:
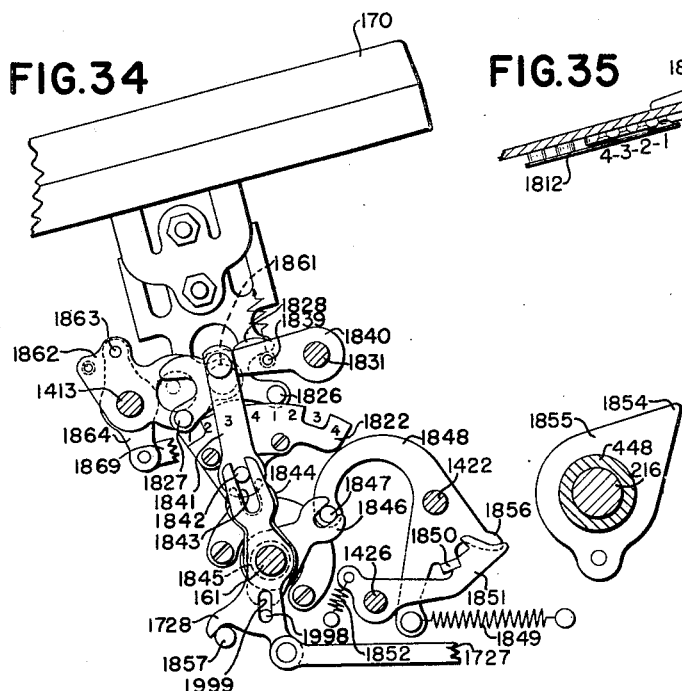

Fig. 34 is a detail view of a portion of the mechanism for controlling the tabulation of the traveling carriage and for controlling the line-spacing of the platen roll by means of the main release bar.

Figure 35:
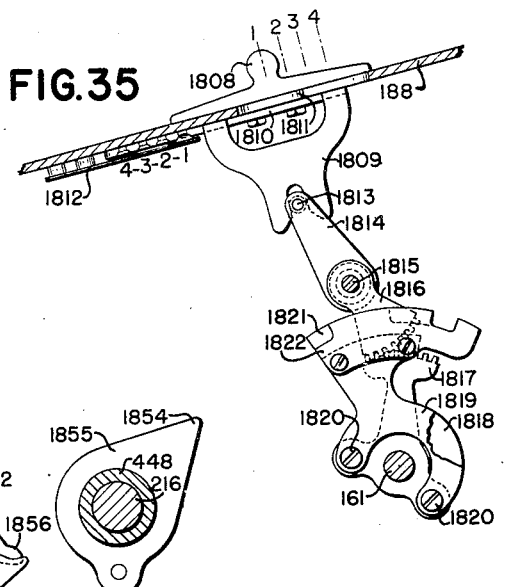

Fig. 35 is a detail view of the manipulative lever and the selecting mechanism associated therewith for varying the control of the machine release bars over the tabulating mechanism and the line-spacing mechanism.

Figure 36:
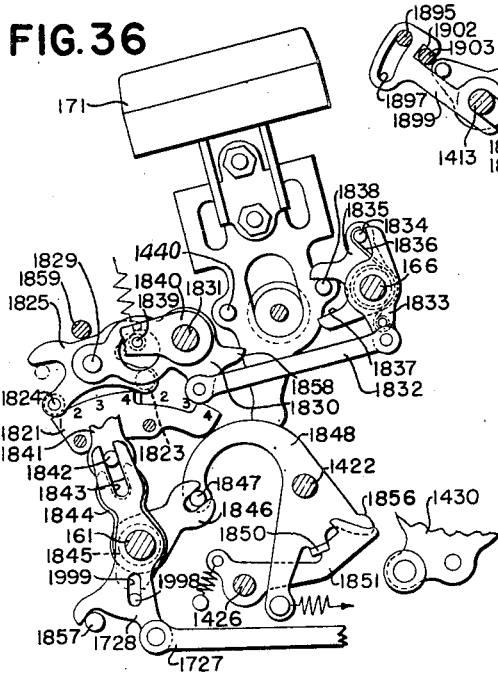

Fig. 36 is a detail view of one of the auxiliary release bars and the mechanism associated therewith for controlling the line-spacing or vertical feeding movement of the platen roll.

Figure 37:
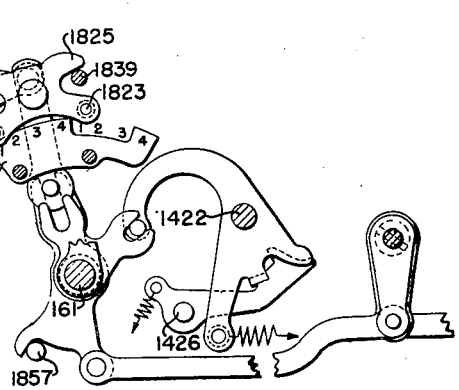

Fig. 37 is a detail view of a portion of the mechanism for controlling the column-to-column tabulating movement of the traveling carriage and for controlling the line-spacing movement of the platen roll.

Fig. 38 is a right side elevation of a portion of the mechanism for controlling the tabulating function of the traveling carriage and the line-spacing function of the platen roll in automatic machine operations.

Fig. 39 is a detail view of a portion of the mechanism associated with the mechanism shown in Fig. 38 for controlling certain functions of the traveling carriage and the platen roll in automatic machine operations.

GENERAL DESCRIPTION

The mechanism of the machine chosen to illustrate the present invention is driven by a conventional type of electric motor, which may be released for operation either by any one of the three release bars including a main release bar and two auxiliary bars, or by any one of a plurality of so-called motorized control keys, or automatically by means of the traveling carriage in selected columnar positions thereof. The main operating motor is of the semi-continuously running type, there being an automatic shut-off device provided for breaking the electrical current to the motor in case said motor is left running and the machine is not operated over a certain period. Release of the machine for operation restores this automatic shut-off mechanism to initial position.

Instead of the conventional type of oscillating cam shaft usually found in machines of this type, the present machine is provided with a rotary cam shaft, which makes one revolution each machine operation to drive the different mechanisms of the machine. Depression of any one of the three motor bars, or any one of the various motorized control keys, causes the main cam shaft to be clutched to the operating motor which drives said cam shaft through one revolution of movement, after which said cam shaft is automatically declutched from the motor mechanism.

After the automatic shut-off mechanism has functioned to stop operation of the motor, depression of any one of the starting bars or any one of the motorized control keys, in addition to engaging the clutch mechanism, as explained above, simultaneously operates the switch to energize the machine operating motor.

The machine of the present invention is equipped with a laterally shiftable traveling carriage, which is driven in both tabulating and return directions by a non-positive hydraulic driving mechanism similar in many respects to that disclosed in the Ganger Patent No. 2,217,221.

The hydraulic mechanism for the traveling carriage is driven by an independent motor, which is actuated by the same switch mechanism which controls the main motor for driving the machine proper. The independent motor for the traveling carriage likewise, through a positive connection, drives an auxiliary cam shaft for controlling all the functions of the traveling carriage with the exception of its tabulating and return movements.

The auxiliary cam shaft for the traveling carriage mechanism drives a plurality of clutch driven members for a series of clutches which are actuated under the control of the machine controlling mechanisms to initiate the various functions of the traveling carriage and in some cases of the machine proper. These functions include the opening and closing of the front-feed throat of the traveling carriage, line-spacing movement of the platen roll, reversing the lateral movement of the traveling carriage, depressing the tabulating stop plungers to release the traveling carriage for either tabulating or return movement, and initiating automatic operation of the machine.

The throat opening or front-feed mechanism mentioned above, which is actuated by the auxiliary cam shaft, moves the platen roll from printing position to a front feeding position, and, when said platen roll is in said front feeding position, the statement sheet, record sheet, or any other suitable record material may be inserted and/or removed at the front of the platen roll. In either case, said record material is guided around said platen roll by a front-feed throat. Record material inserted in the front-feed throat may be located in relation to the printing mechanism by means of a line-finding bar, which extends across the front of the traveling carriage and forms a part of the front-feed throat.

In addition to the statement or ledger sheet, a duplicate record of the transactions over a certain period of time is usually recorded on a journal sheet, which is threaded around the platen roll and is retained in place, when the platen is moved from front feeding position to printing position and vice versa, by means of pressure rollers, which are not affected by the opening and closing of the front-feed throat.

The column selection and other functions of the traveling carriage are controlled by a row of keys located just above the regular amount keyboard, said keys including a left margin key, ten column selecting keys, a step-by-step tabulating key, a throat opening key, and a line-spacing or paper feed key. As presently constructed, the traveling carriage has a maximum of ten columnar positions. Any or all of these columnar positions may be used, depending upon the particular business system to which the machine is being applied.

The functions of the main release bar and one of the auxiliary release bars may be varied and/or controlled by means of a selectively controlled mechanism which may be positioned by means of a fingerpiece located on the main keyboard adjacent to the main release bar.

When the selectively controlled mechanism is in one position, normal depression of the main release bar causes the traveling carriage to be moved in a tabulating direction step by step from one columnar position to the next, and, when said selecting mechanism is in another position, normal depression of said main release bar causes the platen roll to be revolved to line-space the record material supported thereby. Maintaining the main release bar in fully depressed position renders the tabulating mechanism and the line-spacing mechanism referred to above ineffective and in turn effectuates a column selecting mechanism to cause the traveling carriage to be moved to a particular columnar position; and in addition renders another control for the line-spacing mechanism effective to cause the platen roll to be rotated to line-space the record material.

In addition to initiating operation of the machine, depression of any of the motorized control keys shifts the control of the traveling carriage to the selectively controlled mechanism, which, depending upon its position, causes the traveling carriage to be tabulated step by step or causes the platen roll to be rotated to line-space the record material.

The mechanism outlined in general above, which is pertinent to the present invention, will be described in detail in the ensuing pages.

DETAILED DESCRIPTION

Framework

The main framework of the machine embodying this invention comprises a right side frame 130 (Figs. 5-A, 11, 12-A, and 12-B) and a left frame 131 secured to a machine base 132, said right and left frames being secured in fixed relationship to each other by a cross frame 133 and by various other cross frames, rods, and shafts.

The totalizers of the machine are mounted in a framework (not shown) comprising right and left frames and various cross frames, rods, and shafts, said framework being secured to the machine base 132.

The present machine is provided with a laterally shiftable traveling carriage 136 (Figs. 1 and 33), which is supported for shifting movement on rails 137 and 138 (Figs. 12-A and 12-B) in turn secured to carriage support frames 139 and 140 secured to the machine base 132. The rail 137 is also secured to the right and left frames 130 and 131 and aids in supporting said frames in proper relationship to each other. The mechanism of the machine is enclosed in a suitable cabinet or case 141 (Figs. 1 and 5-B), which is in turn secured to the machine base 132.

Operating mechanism

The main mechanism of the machine is driven by a conventional type of electric motor, not shown, but disclosed in one or more of the patents referred to at the beginning of this specification, said motor being secured to the lower surface of the machine base. The electric motor is connected by a clutch mechanism and a train of gears including a gear 215 (Fig. 5-A) to a main drive shaft 216 journaled in the main framework of the machine. The energizing of the motor and the engaging of the motor clutch are controlled by any one of three starting bars, including a main starting or Release bar 170, a Vertical feed release bar 171, and a Skip tabulating release bar 172. The three release bars are depressibly mounted on a plate 168 (Fig. 5-A) in turn secured to the main frame 130 by screws 169.

Depression of any one of the release bars 170, 171, or 172 (Figs. 1, 3, and 5-A) engages the motor clutch mechanism and at the same time operates an electric switch which completes the circuit to the operating motor, whereupon said motor drives the main shaft 216 in a counter-clockwise directtion, as viewed in Fig. 5-A, through one revolution of movement, which is required for each machine operation. As the main shaft 216 nears the end of one counter-clockwise revolution, the clutch mechanism is automatically disengaged to terminate operation of the machine in the usual and well-known manner.

Once the motor switch mechanism is rendered operative, as explained above, it remains effective and causes the main operating motor, as well as the auxiliary motor for driving the traveling carriage mechanism, to operate continuously until a delayed action mechanism (not shown), which is operated through a train of gearing connected to the main operating motor, shuts off or restores said switch mechanism after said operating motor has run a certain interval of time without the machine's having been operated by release of the clutch mechanism, as explained above. Each time the machine is operated, the delayed action mechanism is restored to initial position.

In addition to the release bars 170, 171, and 172 (Figs. 1 and 3), machine operation may be initiated by certain control keys and by means of the traveling carriage in predetermined columnar positions thereof. However, this releasing mechanism is not pertinent to this invention and will not be further explained herein.

Keyboard in general

Figure 1:
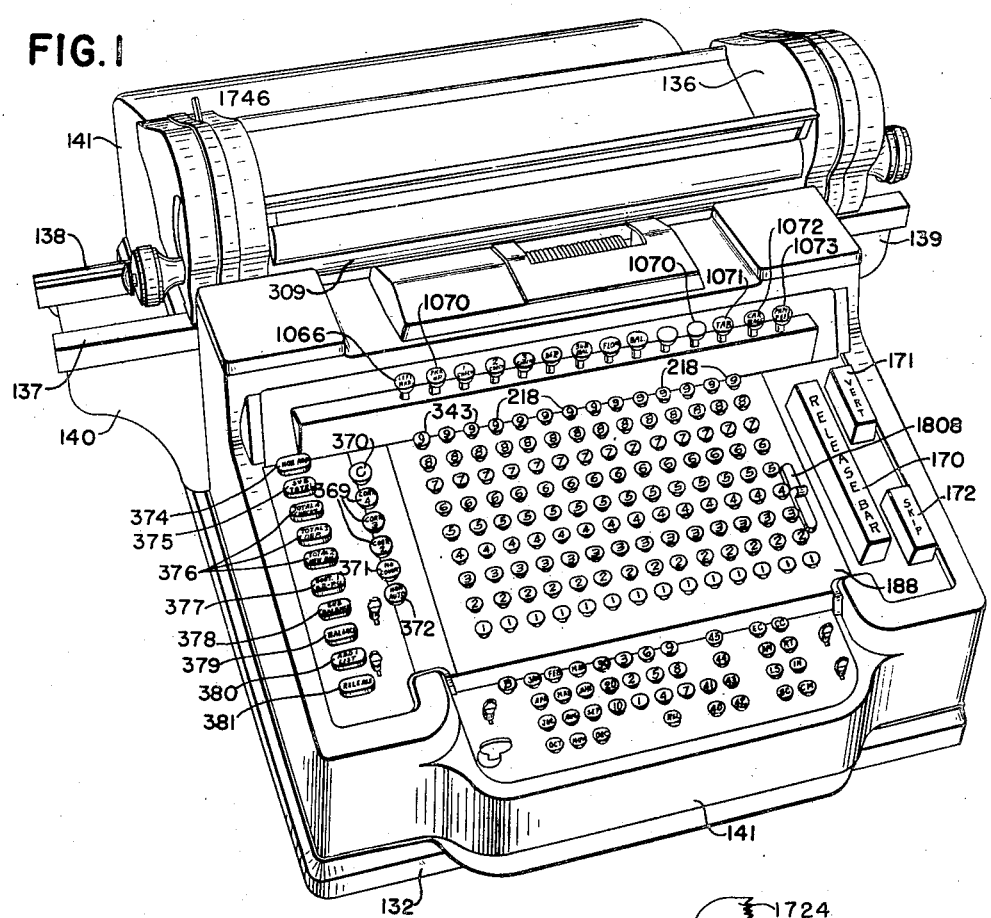
Fig. 1 is a perspective view of the complete machine.
Figure 3:
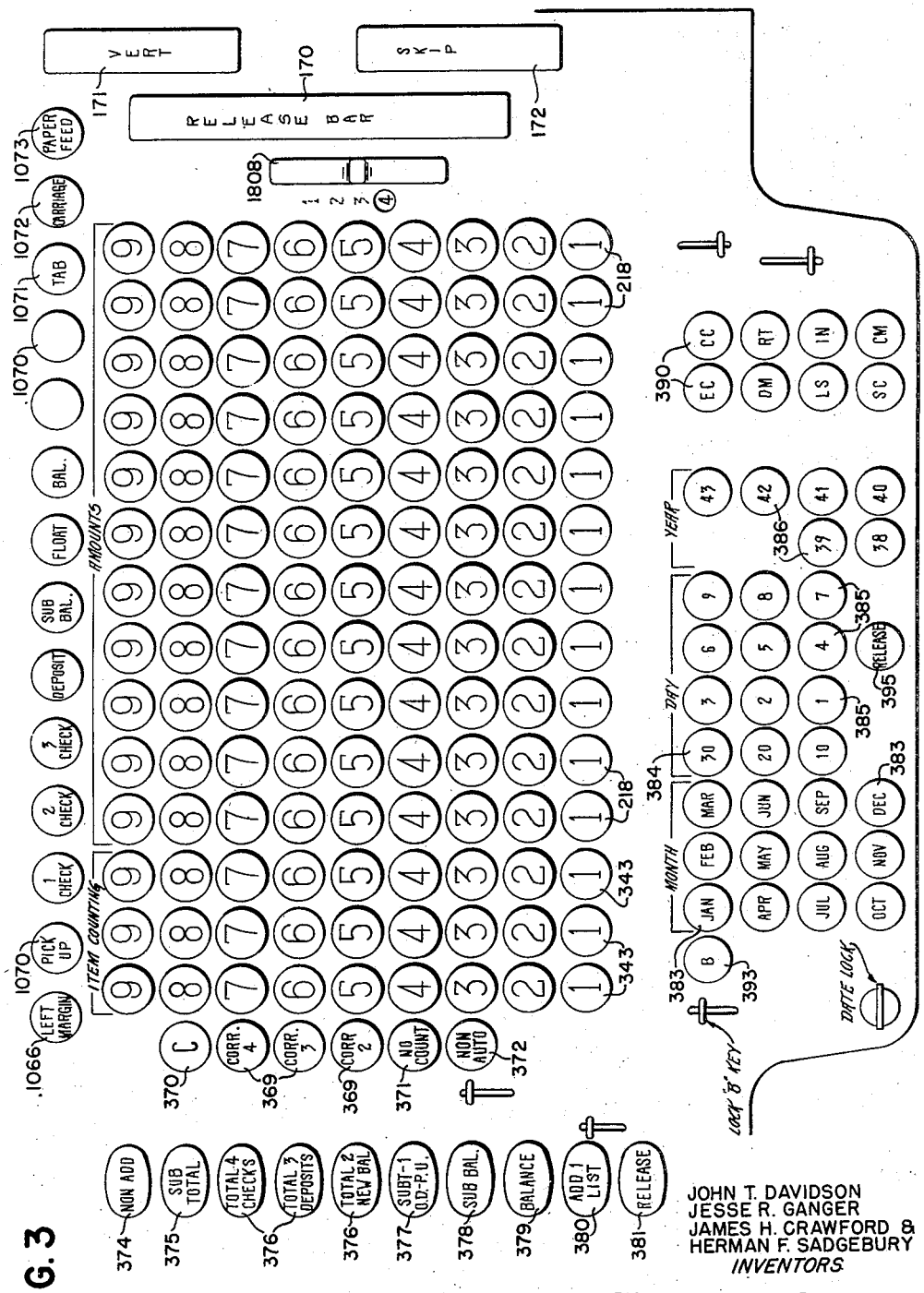
Fig. 3 is a diagrammatic plan view of the keyboard of the machine of this invention.

By referring to Figs. 1 and 3, it will be seen that in the present construction there are eleven rows of amount keys 218 and three rows of item-counting keys 343, which are similar in every respect to the amount keys, and, together with said amount keys, are mounted in a removable keyboard framework 188.

To the immediate left of the item-counting keys 343 is a row of keys including three Correction keys 369, used in correcting errors in certain of the totalizers, a Control key 370, a No-count key 371, and a Non-auto key 372. Located to the left of the correction keys is a row of control keys including keys 374 to 380 inclusive for controlling the various functions of the totalizers, and including a Release key 381 for releasing any depressed keys of the main keyboard.

Located immediately above the amount and item-counting keys is a row of carriage control keys (Figs. 1 and 3) including a Left margin key 1066, ten column selecting keys 1070, a Tabulating key 1071, a Carriage throat opening key 1072, and a Paper feed or vertical feed key 1073.

Located beneath the amount keyboard is an auxiliary keyboard including Month keys 383, Tens of days keys 384, Units of days keys 385, Year keys 386, Symbol-printing keys 390, a Black key 393 for controlling the shifting of the bi-chrome inking ribbon, and a Release key 395 for releasing any depressed keys of the auxiliary keyboard. The main and auxiliary keyboards also include various locks for controlling the depression and releasing of certain keys.

The machine release bars 170, 171, and 172 (Figs. 1 and 3), which are located on the extreme right of the main keyboard, have associated therewith a selectively controlled mechanism for controlling certain functions of the machine and the traveling carriage, and the operation of this selectively controlled mechanism may be varied by means of a manually positionable control slide 1808 (Figs. 1 and 35) mounted on the main keyboard between the release bar 170 and the first row of amount keys 218.

Amount actuators and totalizers

The structure and functioning of the amount keyboard of the machine embodying the present invention are similar in every respect to the amount keyboard of the machine disclosed in United States Patent No. 2,189,851, issued to Paul H. Williams et al., to which reference may be had for a more detailed description of the keyboard mechanism than is believed necessary in connection with this specification.

The amount keyboard of the present machine comprises the eleven denominational rows of amount keys 218 (Figs. 1 and 3) and the three rows of item-counting keys 343 mounted in the removable keyboard framework 188, which is in turn supported between the main frames of the machine. The removable keyboard framework is secured in place by a locking mechanism, the releasing of which permits said keyboard framework to be removed from the machine as a unit, in case it is necessary or desirable.

Each denominational row of amount keys has associated therewith an amount differential actuator (not shown) positionable in adding and subtracting operations under influence of the corresponding amount keys 218. The actuators in turn position corresponding printing elements, which record the value of the depressed amount keys upon record material supported by the platen roll of the traveling carriage 136. Each of the amount actuators has a rearwardly-disposed extension rack, each of which has three sets of rack teeth on its upper edge and three sets of rack teeth on its lower edge, which cooperate with the corresponding denominational wheels of the six totalizer lines with which the machine is provided, said totalizer lines being arranged in vertical pairs at the rear of the machine, as is the usual practice with machines of this type.

As stated above, the present machine is provided with six totalizers; however, this is a matter of choice, as the number of totalizers may be increased or decreased to meet the needs of the business system to which the machine is being applied.

The six totalizers of the machine include a No. 1 or balance totalizer and a No. 5 or overdraft totalizer, which is used in conjunction with the balance totalizer and is always complementary thereto. In total recording operations, in which the balance totalizer is overdrawn, the overdraft totalizer, which at this time is in a positive condition, is automatically selected for reading and/or resetting, so that a positive amount of the overdraft or a true negative balance is recorded upon the record material. In addition to the balance totalizer and the overdraft totalizer, the machine is also provided with three adding and subtracting totalizers Nos. 2, 3, and 4, which may be used in any manner desired, and an item-counting totalizer, No. 6, which is used in conjunction with the item-counting key 343 (Figs. 1 and 3) to accumulate and record the amount of certain predetermined items.

The various totalizers of the machine are selected for engagement with the amount actuators in adding, subtracting, sub-total, and total operations, either by means of the traveling carriage in columnar positions thereof, or by means of the control keys 374 to 380 inclusive (Figs. 1 and 3).

In adding and subtracting operations, the amount actuators are positioned under influence of the amount keys and, in adding operations, revolve the wheels of the selected totalizer or totalizers in an additive direction to add therein the value of the depressed amount keys. In subtract operations, the amount actuators revolve the corresponding wheels of the selected totalizer or totalizers in a subtractive direction to subtract therefrom the value of the depressed amount keys. Each of the totalizers is provided with a transfer mechanism for transferring tens digits from lower to higher denominations.

In total and sub-total operations, the wheels of the selected totalizer are engaged with the amount actuators prior to their initial movement, which movement reversely rotates said wheels to zero position, to position said actuators and the corresponding printing elements in accordance with the amount standing on said selected totalizer wheels. In total operations, the wheels of the selected totalizer are disengaged from the amount actuators prior to their return movement, and consequently said wheels remain in a zeroized condition; and in sub-total operations the wheels of the selected totalizer remain in engagement with the amount actuators during their return movement, which movement restores said wheels to their original positions.

*Traveling carriage*

Referring to Figs. 1 and 14, the traveling carriage 136 supports a platen roll 309 for presenting record material, such as a statement slip 1550, a fragment of which is shown in Fig. 32, to the printing mechanism.

The platen roll 309 is movable from a printing position to a more accessible position, often referred to as front-feed or open-throat position, for the ready removal and insertion of record material at the front of the platen roll 309 instead of the conventional method of inserting record material at the back of the platen roll, and winding said material around said roll. Such a traveling carriage as this is often referred to as a front-feed type of traveling carriage, and, when the platen roll 309 is moved from printing position to front-feed position, the pressure rollers are released and the throat for guiding the record material around said platen roll is opened, so that the statement sheet which has been audited may be readily removed from the machine and a new sheet inserted into the open throat and pushed directly into position by the aid of a line-finding device, which forms a part of the front-feed throat.

In addition to the statement slip 155 (Fig. 32), which is inserted in the front of the machine, as explained above, a duplicate of all entries for a certain period of time, such as a day, is recorded on a journal sheet, which is wound around the platen roll 309 in the conventional manner and is retained in place by pressure rollers provided for that purpose, when the traveling carriage is moved from printing position to open-throat position and vice versa.

The traveling carriage 136 is movable in a tabulating direction and in a return direction, and the mechanism for moving said carriage in either of said directions is connected by a hydraulic clutch device to a semi-continuously running motor, which operates in unison with but independently of the main operating motor for the machine proper and is for the primary purpose of operating the traveling carriage mechanism.

As previously explained, the functions of the traveling carriage are controlled by the row of carriage controy keys located just above the amount keyboard (Figs. 1 and 3), said row of keys including the Left margin key 1066, the ten Column selecting keys 1070, the Tabulating key 1071, the Carriage key 1072 for opening and closing the front-feed throat, and the Paper feed key 1073 for causing the platen roll 309 to be rotated to line-space the record material supported thereby.

The Column selecting keys 1070 operate through an indexing device, which is operatively connected to the traveling carriage through the medium of studs 732 on each of a series of control blocks 722 (Fig. 19) located in columnar positions of the carriage on a stop bar 729 (Figs. 14 and 19) removably mounted on said carriage. The indexing device is indexed one step by said studs each time the traveling carriage moves from one columnar position to the next. In this manner, the indexing device senses the position of the traveling carriage and determines whether said carriage shall be moved in a return direction or in a tabulating direction, depending upon the location of the columnar position corresponding to the depressed column selecting key. This in effect causes the ten column selecting keys 1070 to function either as tabulating keys or as carriage return keys to cause the traveling carriage to be moved either in a tabulating direction or in a return direction from any preselected columnar position to the columnar position corresponding to the depressed column selecting key.

The semi-continuously running motor for the traveling carriage, in addition to driving said carriage in return and tabulating directions, is directly connected to and operates a shaft for driving a plurality of cams which are connectable to said shaft by their respective clutch devices, which are in turn controlled by the carriage control keys 1070, 1071, 1072, and 1073 (Figs. 1 and 3) for operating the different mechanisms associated with the traveling carriage. The cams referred to above operate, respectively, the mechanism for pulling down the carriage stop plungers, the mechanism for reversing movement of the traveling carriage, the throat opening mechanism for moving the platen roll from printing position to open throat or front-feed position and vice versa, the mechanism for rotating the platen roll to cause the record material to be line-spaced, and the mechanism for operating the automatic machine-releasing mechanism.

The framework for the traveling carriage 136 (Figs. 1, 14, and 33) comprises right and left outside plates 1074 and 1075 and right or left inside plates 1076 and 1077, secured in fixed relationship to each other by a bottom plate 730 and by an angle bar 1078, which bar 1078 supports upper and lower rollers 1079 and 1080, which cooperate, respectively, with the top surface of the rail 137 and the lower surface of a flange thereof to support the front end of the traveling carriage 136 for shifting movement. Secured to the bottom surface of the plate 730 (Figs. 14 and 33) is an angle bar 1081, which supports a plurality of upper and lower rollers 1082 and 1083, said upper rollers 1082 having therein V-shaped annular grooves which cooperate with the rounded upper surface of the rail 138 to support the traveling carriage for lateral shifting movement, and at the same time to prevent side displacement of said carriage. The rollers 1083 cooperate with the lower surface of a flange formed on the rail 138 and, in cooperation with the rollers 1080, prevent upward displacement of the carriage 136.

The rearward edge of the bottom plate 730 (Figs. 14 and 33) has thereon gear teeth which mesh with a gear 1085 secured on the upper end of a shaft 1086 vertically mounted for rotation in a frame 1087 supported by the end frames 139 and 140 (Fig. 1). The shaft 1086 has secured on its lower end a bevel pinion 1088, which meshes with two similar carriage reversing gears (not shown). The two reversing gears have clutch teeth which mesh with similar clutch teeth in reversing clutch members (not shown) shiftably supported on a shaft 1091 (Fig. 12-B) journaled in the frame 1087. The shaft 1091 (Figs. 5-B and 12-B) has secured on its right-hand end a bevel gear 1096, which meshes with a corresponding bevel gear 1097 secured on the upper end of a vertical shaft 1098 journaled in the frame 1087 and connected by a flexible coupling 1099 to a vertical shaft 1100 for the hydraulic mechanism, said shaft being journaled in a hydraulic device framework 1101 secured to the machine base 132.

The shaft 1100 has a non-positive fluid connection to a fluid drive device 1102, which is similar in every respect to the hydraulic device disclosed in the United States Patent No. 2,217,221, issued to Jesse R. Ganger on October 8, 1940, and for that reason will be but briefly described herein.

The cylindrical hydraulic member 1102 (Fig. 5-B) has on its lower end a tenon which journals in a bushing in the frame-like casting 1101, and said member likewise has secured to its bottom surface a gear 1103, which meshes with a gear 1104 secured on the lower end of a shaft 1105 mounted for vertical rotation in the casting 1101. The shaft 1105 has secured on its upper end a worm gear 1106, which meshes with a companion worm gear 1107 secured on a short shaft journaled in the casting 1101 in axial alinement with the armature shaft of a carriage motor 1109 secured to the base 132 and connected to said armature shaft by a flexible coupling 1108, which forms a yieldable driving medium between said motor 1109 and the hydraulic device. The hydraulic member 1102 is submerged in oil contained in the casting 1101, said casting forming a reservoir for constantly replenishing the oil in said hydraulic member 1102.

The motor 1109 (Fig. 5-B), through the gearing and connections described above, drives the hydraulic member 1102 in the direction indicated by the arrow, and, as said member has a fluid connection to the shaft 1100, said shaft is non-positively driven in the same direction, which movement, through the flexible coupling 1099, is imparted to the shaft 1098 and to the bevel gear 1097, which in turn drives the gear 1096 and the shaft 1091 counter-clockwise as viewed in Fig. 5-B. The two clutch members supported by the shaft 1091 are driven in unison with said shaft and through their corresponding bevel gears move the traveling carriage 136 (Figs. 1, 12-A, and 12-B) either in a tabulating direction or in a return direction, depending upon which of said clutch members is engaged with the corresponding bevel gear.

*Traveling carriage throat opening mechanism*

By referring to Fig. 33, it will be recalled that the platen roll 309 is mounted in a traveling carriage framework comprising right and left outside plates 1074 and 1075 and right and left inside plates 1076 and 1077 secured in fixed relationship to each other by the bottom plate 730 and the angle bar 1078, and that said carriage carries rollers which cooperate with the front rail 137 and the rear rail 138 for mounting said carriage for horizontal shifting movement.

The mechanism for moving the platen roll 309 (Fig. 33) to and from printing position is mounted between the plates 1074 and 1075 and 1076 and 1077, and, inasmuch as this mechanism is duplicated on each side of the traveling carriage, it is believed that an explanation of the right-hand mechanism supported by the plates 1074 and 1076 will be sufficient.

Directing attention to Figs. 14, 15, 31, and 33, the platen roll 309 has a wooden core 1441 with a central bore which receives tenons on right and left trunnion bushings 1442 having flanges which are fastened to the core 1441 by suitable screws.

The trunnion bushings 1442 extend through irregular openings in the plates 1076 and 1077, and their outside diameters are freely engaged by holes in the upper ends of similar arms 1443, having secured in their lower ends hubs which freely engage studs 1444 extending between the plates 1074 and 1075 and 1076 and 1077, respectively. Torsion springs 1445, freely coiled around the studs 1444, are tensioned to urge the arms 1443 counter-clockwise (Fig. 14) to assist the platen roll 309 to open throat or front feeding position and to thereby partially counterbalance the weight of said platen roll so that it may easily be moved to and from printing position. Also free on the right and left bushings 1442 are similar cranks 1446 having in their lower ends slots which are engaged by studs 1447 in the upper ends of arms 1448 secured on a shaft 1449 journaled in the plates 1074 to 1077 inclusive. Also secured on opposite ends of the shaft 1449 are similar cranks 1450 connected by links 1451 to upward extensions of similar arms 1452 free on their respective studs 1453 supported, respectively, by the plates 1074 and 1076, and 1075 and 1077. Extending between the arms 1452 and secured thereto is a bar 1454 having a horizontal groove 1455 formed therein, which cooperates with an upward extension 1456 of an operating slide 1457 mounted for horizontal reciprocating movement by means of parallel slots therein (Figs. 12-A, 12-B, 13, 28, and 29) in cooperation with screw studs 1458 secured in the frame 1087. A depending portion 1459 of the slide 1457 is embraced by studs 1460 and 1461 in similar arms 1462 and 1463 pivoted at their lower ends, respectively, to the rod 1165 and a stud 1464, said stud being supported by a bracket 1465 in turn supported by the rod 1165 and having an upward extension which is secured to the frame 1087. A link 1466 (Fig. 29), extending between the studs 1460 and 1461, maintains said studs in proper spaced relationship to the depending portion 1459.

The arms 1462 and 1463 carry, respectively, rollers 1467 and 1468, which cooperate with the periphery of a plate cam 1469, connected by a hub 1470 (Figs. 6, 7, 12-B, 13, and 29), free on the shaft 1153, to a clutch driven member 1471. The clutch driven member 1471 has clutch teeth which cooperate with corresponding clutch teeth in a clutch driving member 1472 having a tongue and groove connection to a sleeve 1473 free on the shaft 1153 and having secured thereon a gear 1474, which meshes with a pinion 1475 integral with a gear 1476 free on a stud 1477 secured in the frame 1087. The gear 1476 meshes with a pinion 1478 secured on the shaft 1153, said gearing forming a reduction drive between said shaft 1153 and the sleeve 1473, which drives the clutch driving member 1472.

The clutch driving member 1472 has therein an annular groove engaged by opposed shifting studs 1479 secured in the parallel arms of a shifting yoke 1480 free on a stud 1481 supported by the frame 1087 and the right top plate 1136 (Figs. 9, 12-B, and 13). An extension 1483 (Fig. 6) of the lower arm of the yoke 1480 is engaged by the tooth of a latch 1484 free on a shaft 1485 journaled in the frame 1087, said latch and said yoke 1480 having tensioned therebetween a spring 1487, which urges these parts clockwise to normally maintain said extension 1483 in engagement with the tooth of the latch 1484. The latch 1484 (Fig. 6) has therein an L-shaped slot, through which extends an upward projection of an arm 1488 pivotally and shiftably mounted on the lower arm of the yoke 1480 by means of a stud therein in cooperation with a slot in said lower arm. The upward projection of the arm 1488 extends into the path of a finger 1489 secured on the shaft 1485, said shaft also having secured thereon an arm 1490 (see also Figs. 5-B and 12-B) having in its lower end a stud 1491, which engages a slot in the forward end of a link 1492. The rearward end of the link 1492 is connected to an arm 1493 adjustably connected to a shaft 1494 journaled in the frame 1087 by means of a bolt-and-nut connection to a crank secured on said shaft.

Also secured on the shaft 1494 is a depending arm 1495 pivotally connected by a link 1496 to a lever 1497 free on a stud 1498 (Figs. 5-A and 5-B) secured in the plate 1191. The lower end of the lever 1497 has a slot which engages a stud 1499 in the upper end of a companion lever 1500 free on a stud 1501 fast in the plate 1191. The lower end of the lever 1500 has pivotally connected thereto the rearward end of a link 1502, the forward end of which is slotted to receive a stud 1503 in the lower end of a lever 1504 free on the stud 1422. The link 1502 has an upward projection 1505 (Figs. 4 and 5-A), which cooperates with a stud 1506 in a plate 1507 free on a stud 1508 secured in the plate 1191. A link 1510 pivotally connects the plate 1507 to a crank 1511 secured on the right-hand end of a shaft 1512 journaled in a boring in the stud 304, said shaft having also secured thereon a crank 1513 pivotally connected to the lower end of the stem portion 1514 of the Carriage key 1072. A spring 1509, tensioned between the plate 1507 and a stationary stud, urges said plate counter-clockwise (Fig. 5-A) to normally maintain the Carriage key 1072 in undepressed position.

Depression of the key 1072 (Figs. 4 and 5-A) rocks the plate 1507 clockwise against the action of the spring 1509, causing the stud 1506, in cooperation with the projection 1505, to shift the link 1502 forwardly. Forward movement of the link 1502, through the levers 1500 and 1497, also shifts the link 1496 (Figs. 5-B and 12-B) forwardly to rock the shaft 1494 and the arm 1493 clockwise against the action of a spring 1515. Clockwise movement of the arm 1493 shifts the link 1492 (Figs. 6 and 12-B) rearwardly, causing the slot in its forward end, in cooperation with the stud 1491, to rock the arm 1490, the shaft 1485, and the finger 1489 counter-clockwise, as viewed here, against the action of a spring 1516 tensioned between said arm 1490 and a stud in the frame 1087. Counter-clockwise movement of the finger 1489, in cooperation with the upward projection of the arm 1488 and the narrow portion of the slot in the latch 1484, rocks said latch counter-clockwise out of engagement with the extension 1483 to release the yoke 1480 to the action of the spring 1487, which immediately rocks said yoke clockwise (Figs. 6, 12-B, and 13) to cause said yoke to shift the clutch driving member 1472 into engagement with the teeth in the clutch driven member 1471 to drive said clutch driven member and the cam 1469 clockwise, as viewed in Figs. 13 and 29.

In Figs. 14 and 29, the slide 1457 is shown in the position which it occupies when the platen roll 309 is in printing position. Clockwise movement of the cam 1469, in cooperation with the roller 1468, shifts the arms 1463 and 1462 forwardly or counter-clockwise, causing the studs 1460 and 1461 in said arms, in cooperation with the depending portion 1459, to shift the slide 1457 forwardly to the position shown in full lines in Fig. 15 and in dot-and-dash lines in Fig. 29. To effect the shifting of the slide 1457 as explained above requires one-half revolution of the cam 1469 (Fig. 29), and, after said cam makes one-half revolution, the clutch mechanism is disengaged in a manner to be explained presently and remains thus disengaged until the Carriage key is again depressed.

Forward movement of the slide 1457 causes the upward extension 1456, in cooperation with the horizontal groove 1455 in the bar 1454, to rock said bar and the arms 1452 clockwise from the position shown in Fig. 14 to the position shown in Fig. 15. Clockwise movement of the arms 1452, by means of the links 1451, imparts a similar movement to the cranks 1450, the shaft 1494, and the arms 1448, to rock said parts from the position shown in Fig. 14 to the position shown in Fig. 15. Clockwise movement of the arms 1448, by means of the studs 1447 in cooperation with the slots in the cranks 1446, rocks the platen roll 309, which is pivoted through the arms 1443 to the studs 1444, counter-clockwise from printing position, as shown in Fig. 14, to open throat position, as shown in Fig. 15.

Clockwise engaging movement of the yoke 1480 (Fig. 6) causes a bent-over extension thereon to engage the arm 1488 and rock said arm clockwise against the action of a spring to shift the upturned projection of said arm into the wide portion of the slot in the latch 1484, to permit the spring 1487 to immediately return the tooth of said latch into the path of the extension 1483. After the clutch member 1471 and the cam 1469 (Figs. 6 and 13) have completed one-half revolution, the angular camming surface on a node 1518 on the edge of said clutch member 1471 engages a flattened extension 1519 of the stud 1479 in the lower arm of the yoke 1480 to rock said yoke counter-clockwise to disengage the teeth of the clutch driving member 1472 from the teeth in the driven member 1471 and to permit the tooth of the latch 1484 to latch over the extension 1483 to prevent further operation of said clutch driven member 1471, to cause the platen roll to remain in open throat position.

When pressure is released on the Carriage key 1072 (Figs. 4, 5-A, and 5-B), the springs 1509, 1515, and 1516 (Fig. 6) return the corresponding parts to normal position, thus disengaging the shoulder on the end of the finger 1489 from the upturned projection 1488 to release said arm to the action of its spring, which immediately shifts said arm counter-clockwise to move said upward projection into the narrow portion of the slot in the latch 1484 in preparation for another operation of the throat opening and closing mechanism.

Again depressing the Carriage key 1072 (Figs. 4, 5-A, and 5-B) renders the clutch mechanism shown in Fig. 6 again effective to cause the clutch driven member 1471 and the cam 1469 (Fig. 29) to be driven another one-half revolution clockwise. This second one-half revolution of the cam 1469, in cooperation with the roller 1467, rocks the arms 1462 and 1463 clockwise, causing the studs 1460 and 1461, in cooperation with the portion 1459, to shift the slide 1457 rearwardly to normal or printing position, as shown in Fig. 29, to rock the platen roll 309 from open throat position, as shown in Fig. 15, to printing position, as shown in Fig. 14. After the cam 1469 has completed its second one-half revolution of movement, as explained above, the node 1518 (Figs. 6 and 13) of the clutch member 1471, in cooperation with a flattened extension of the stud 1479 in the upper arm of the yoke 1480, restores said yoke counter-clockwise in exactly the same manner as explained above.

A locating disk 1521 (Figs. 7 and 13), secured in fixed relationship to the cam 1469 and the clutch member 1471 by the sleeve 1470, has diametrically opposed locating notches 1522, which cooperate with a roller 1523 carried by a lever 1524 free on the rod 1165 and urged counterclockwise by a strong spring 1525, to assist and retain said cam 1469 and clutch member 1471 in either of their moved positions. An extension 1526 on the lower end of the lever 1524, in cooperation with a finished surface on the frame 1087, determines the extent of movement of said lever under influence of the spring 1525.

*Automatic throat opening near the end of machine operations*

Mechanism is provided for automatically operating the clutch mechanism for the throat opening device near the end of machine operation to cause the platen roll to be moved from printing position to open throat position.

A torsion spring 2521 (Fig. 5-A) urges the lever 1504 clockwise to normally maintain a bent-over ear 2522 in engagement with a shoulder on a latch 2523, which is spring-urged counter-clockwise. Near the end of machine operation and after the printing mechanism has functioned, a projection 2524 on a plate 2525, secured to the sleeve 448, engages a finger of said latch 2523 to rock said latch clockwise against the action of its spring to free the lever 1504 for clockwise movement under influence of the spring 2521.

Clockwise movement of the lever 1504 causes the stud 1503 in its lower end, in cooperation with the slot in the link 1502, to shift said link forwardly to actuate the clutch mechanism shown in Fig. 6 in exactly the same manner as explained in connection with the depression of the Carriage key 1072, to cause the platen roll 309 to be moved from printing position to open throat position near the end of machine operation in preperation for the removal of the statement slip shown in Fig. 32 and the insertion of another statement slip.

After the automatic throat opening mechanism has functioned as explained above, a stud 2526 (Fig. 5-A), secured in the plate 252, engages an upward extension of the lever 1504 to restore said lever counter-clockwise against the action of the spring 2521 to permit the shoulder on the latch 2523 to again engage the bent-over ear 2522.

A lock is provided for locking the plate 1507 against clockwise movement during machine operation so that the Carriage key 1072 cannot be depressed at this time.

Initial counter-clockwise movement of the main shaft 216 (Fig. 5-A) causes a flattened stud 1527, carried by a plate 1528 secured to the sleeve 448, to move beyond the forward end of a slide 1529 shiftably mounted by means of parallel slots therein in cooperation with the studs 1501 and 1508. This releases the slide 1529 to the action of a spring 1530, which immediately shifts said slide forwardly to move a square stud 1531, carried thereby, beneath a shoulder formed on the plate 1507 to obstruct clockwise movement of said plate and thereby lock the Carriage key 1072 (Figs. 3 and 4) against depression during operation of the machine.

As explained previously, it takes one counter-clockwise revolution of the main cam shaft 216, as viewed in Fig. 5-A, to effect an operation of the machine, and, near the end of this revolution of movement, the stud 1527, in cooperation with the forward end of the slide 1529, shifts said slide rearwardly against the action of the spring 1530 to move the square stud 1531 out of the path of the shoulder on the plate 1507, to free the Carriage key 1072 for depression.

Mechanism under control of the traveling carriage in columnar positions thereof is also provided for locking the throat opening mechanism against operation during machine operation, and this mechanism will be explained later in connection with other carriage control mechanism.

*Automatic closing of the throat by amount and item counting keys*

The present machine is provided with mechanism whereby depression of any one of the amount keys 218 (Figs. 1 and 3) or any one of the item counting keys 343 causes the platen roll 309 to be moved from front feeding position to printing position, to insure that said platen roll is in printing position prior to initiation of machine operation.

Each of the banks of amount keys 218 (Figs. 1 and 3) and each of the banks of item counting keys 343 has a flexible detent 225 (Fig. 10) associated therewith, having openings with teeth formed therein for cooperating with pins 221 carried by each of said keys 218 and 343.

Depression of any one of the keys 218 or 343 causes the pin 221, in cooperation with an angular camming surface on the corresponding tooth, to shift the corresponding detent 225 rearwardly against the action of a spring 228. When the pin 221 moves beyond the tooth, the spring 228 returns the detent 225 forwardly to latch the key in depressed position. Depression of a second key in the same bank actuates the detent 225 to release the previously depressed key and to latch the second key in depressed position.

Near the end of adding and subtracting operations and at the beginning of sub-total and total operations, the detents 225 are actuated by the key releasing mechanism to release the depressed keys 218 and 343 in the usual and well-known manner.

The stud 1491 (Fig. 6) in the arm 1490 engages a slot 1532 in a link 1533, the upper end of which is pivotally connected to a lever 1534 having a stud 1535, which journals in a hub in the right plate 1136 (Fig. 9). A spring 1536 is tensioned to urge the lever 1534 counterclockwise to normally maintain a stud 1537, carried by said lever, in contact with a camming surface 1538 on one edge of the slide 1457. The lever 1534 has a shoulder 1539, which cooperates with a finger 1540 secured on the left-hand end of a shaft 1541 journaled in the bent-over extensions of a bracket 1542 secured to a downwardly formed extension of the plate 1136. Secured on the right-hand end of the shaft 1541 is an arm 1543 pivotally connected by a link 1544 to a companion link 1545 (Fig. 8), the rearward end of which is supported by an arm 1546 free on a shaft 1016 journaled in the frames 130 and 131, and the forward end of which has a slot which engages a stud 1547 in the upper end of an arm 538.

The arm 538 (Figs. 8 and 10) is free on a shaft 535 journaled in the frame 130, and said arm has a shoulder maintained in yieldable engagement with a stud 531 by a spring 537. The stud 531 is in an arm 529 free on a stud 530 in the frame 130. The arm 529 is slotted to receive the right-hand end of a rod 525 supported in the upper ends of a series of similar cranks 526 fast on a shaft 528 journaled in the keyboard framework. The rod 525 cooperates with the rearward ends of the detents 225 and is normally maintained in yieldable engagement with said detents by a torsion spring, not shown.

By referring to Figs. 6 and 14, it will be noted that, when the platen roll 309 is in its printing position, the slide 1457 is in its rearward position, as shown here, in which position a high portion of the camming surface 1538, in cooperation with the stud 1537, holds the lever 1534 in its clockwise position against the action of the spring 1536, in which position the shoulder 1539 is beyond the finger 1540. Likewise it will be noted that, when the slide 1457 is in its rearward position, an extension 1548 thereof engages the upper end of the finger 1540, to retain the shaft 1541 and connected parts clockwise against the action of a torsion spring 1549 (Fig. 12-B) to normally maintain said finger 1540 out of the path of the shoulder 1539.

As the slide 1457 moves forwardly, to move the platen roll 309 from printing position to open throat position, the extension 1548 (Fig. 6) is withdrawn from the finger 1540, to permit said finger, under influence of the spring 1549, to move into the path of the shoulder 1539 before the high portion of the camming surface 1538 moves beyond the stud 1537, so that said finger will retain the lever 1534 against counter-clockwise movement under the influence of the spring 1536, when said high portion of the camming surface 1538 moves beyond said stud 1537. From the foregoing description it is evident that, when the platen roll 309 is in open throat position, and the slide 1457 is in its forward position, the low portion of the camming surface 1538 is opposite the stud 1537 and the lever 1534 is retained against counter-clockwise movement by the finger 1540, in cooperation with the shoulder 1539.

Depression of any one of the keys 218 or 343 (Figs. 3, 8, and 10) shifts the corresponding detent 225 back and forth to rock the rod 525 and the arm 529 first rearwardly or clockwise and then back to normal position. Clockwise movement of the arm 529 causes the stud 531, in cooperation with the shoulder on the arm 538, to rock said arm counter-clockwise, which movement, by means of the stud 1547, shifts the links 1545 and 1544 forwardly (Figs. 6, 9, and 12-B) to rock the arm 1543, the shaft 1541, and the finger 1540 first clockwise and then back to normal position. Clockwise movement of the finger 1540 disengages the upper end thereof from the shoulder 1539 to free the lever 1534 and the link 1533 for counter-clockwise movement under influence of the spring 1536, which is stronger than and overcomes the effect of the springs 1516 and 1487. The link 1533, through the slot 1532 in cooperation with the stud 1491, rocks the arm 1490, the shaft 1485, and the finger 1489 and the latch 1484 counter-clockwise against the action of the springs 1516 and 1487 to disengage said latch 1484 from the extension 1483 to render the clutch mechanism shown in Fig. 13 effective to cause the slide 1457 to be moved rearwardly to move the platen roll 309 from open throat position to printing position, whenever any one of the keys 218 or 343 is depressed, to insure that said platen is in printing position prior to operation of the machine.

When the finger 1540 and connected mechanism are restored counter-clockwise by the spring 1549 (Figs. 6 and 12-B) immediately after the lever 1534 has been released, as explained above, said finger comes to rest on an arcuate surface formed on said lever 1534, adjacent the shoulder 1539, and remains thus until the extension 1548 again engages said finger immediately after the high portion of the camming surface 1538 has restored said lever 1534 clockwise during rearward movement of the slide 1457 to insure that this mechanism is in ineffective position when the platen 309 is in printing position.

The slots in the forward ends of the links 1492 and 1533 (Fig. 6) permit counter-clockwise releasing movement of the stud 1491 and the arm 1490, under influence of either of said links, without disturbing the other link.

Platen retaining mechanism

Mechanism is provided for retaining the platen roll in either of its moved positions, said mechanism also adapted to retain the statement slip in contact with the platen roll while said platen roll is moving from one position to the other.

The statement slip 1550 (Figs. 16, 17, 18, 21, and 32) is guided around the platen roll 309 by a guide plate 1551, which is secured to a statement slip table 1552 having bent-up portions on each end thereof secured to identical side arms 1553, the forward ends of which have slots 1554, which freely engage the outside diameter of the corresponding trunnion bushing 1442, and the rearward ends of which portions are slotted to embrace corresponding studs 1555 secured in the plates 1076 and 1077 (see also Figs. 14 and 33). Springs 1556 (Fig. 16) are tensioned to urge the statement slip guide table 1552 rearwardly and upwardly to urge the curled forward edge of said guide plate 1551 into yielding engagement with the surface of the platen roll 309 when said platen roll is moving from one position to another, as will be explained presently.

Inasmuch as the mechanism for retaining the platen roll in either of its moved positions is duplicated for each end of said platen roll, only the right-hand mechanism is shown here in detail, and it is believed that a description of this right-hand mechanism will be sufficient for a clear understanding of the functioning of said retaining mechanism.

When the platen roll 309 is in printing position, as shown in Fig. 14, a stud 1557, secured in the right arm 1553, is engaged by the forward end of a retaining arm 1558 pivoted on a stud 1559 secured in a plate 1560, in turn spaced from its corresponding supporting plate 1076 by shoulder studs 1561 and secured to said studs by screws. A downward extension of the arm 1558 carries a stud 1566, which cooperates with a hook-shaped extension 1567 on the corresponding arm 1448. A spring 1568 urges the arm 1558 clockwise to normally maintain its extension in the path of the stud 1557.

When the platen roll 309 is in home position (Figs. 14 and 15), the right and left bushings 1442 rest, respectively, in curved surfaces formed on extensions of right and left plates 1569 adjustably supported by the corresponding end plates 1076 and 1077, said end plates, in cooperation with the stud 1557 and the arm 1558, serving to accurately locate said platen roll 309 in printing position. The slots 1554 in the forward ends of the arms 1553 (Figs. 16 and 18) permit the arm 1558, in cooperation with the stud 1557, to hold the table 1552 and the guide plate 1551 downwardly against the action of the spring 1556 to provide clearance between said guide plate 1551 and the surface of the platen roll 309, to free the statement slip 1550 for line spacing, as will be explained presently.

When the platen roll 309 is in printing position, as shown in Figs. 16 and 18, a plurality of pressure rollers 1563, mounted on yokes 1564 supported by brackets secured to the top surface of the angle bar 1078, are urged clockwise by springs 1565 to maintain the statement slip 1550 in yielding engagement with the surface of the platen roll 309. The pressure rollers 1563 become effective just prior to the time that the guide plate 1551 is moved out of contact with the statement slip 1550 to insure that said statement slip remains in accurate alinement with the printing mechanism and to facilitate its line spacing.

Initial clockwise movement of the arm 1448 (Figs. 14 and 15) to move the platen roll 309 from printing position to open throat or front feeding position causes the hook-shaped extension 1567, in cooperation with the stud 1566, to rock the arm 1558 counter-clockwise against the action of the spring 1568 to move the forward extension of said arm out of the path of the stud 1557 while the stud 1447 is moving idly in the slot in the crank 1446. Disengaging the arm 1558 from the stud 1557 releases the arm 1553 (Figs. 16 and 17), the table 1552, and the guide plate 1551 to the action of the springs 1556, which immediately rock said parts clockwise to cause the curled forward edge of said guide plate 1551 to engage and press the statement slip 1550 against the surface of the platen roll before said platen roll is moved out of engagement with the spring pressure rollers 1563. As the arm 1448 continues its clockwise movement to move the platen roll from printing position to front feeding position, the stud 1566 in the arm 1558 rides on an arcuate surface on the upper edge of the hook-shaped extension 1567. While the platen roll 309 is moving from printing position to front feeding position, the substantially horizontal slots in the rearward ends of the arms 1553 permit the guide plate 1551 to maintain its relationship with said platen roll 309.

As the platen roll 309 nears open throat position and the arm 1448 nears the terminus of its clockwise movement, a rearwardly-disposed surface on a projection 1570 of said arm engages a stud 1571 (Figs. 14, 15, 21, and 22) in a downward extension of an arm 1572 free on a stud 1573 supported by the right plate 1560 to rock said arm 1572 counter-clockwise against the action of its spring 1574. Counter-clockwise movement of the arm 1572 causes its forward extension, in cooperation with the stud 1557 in the right arm 1553, to rock said arm, the table 1552, and the guide plate 1551 counter-clockwise against the action of the springs 1556, to separate said guide plate 1551 from the statement slip 1550, as shown in Fig. 21, so that said statement slip may be readily removed from the machine. Counter-clockwise movement of the arm 1572, under influence of the projection 1570, permits a spring-pulled pawl 1575, carried thereby, to latch over a stationary stud 1576 in the plate 1560.

Counter-clockwise movement of the arm 1572 (Figs. 14, 15, 21, and 22) withdraws a stud 1577, carried thereby, which pivotally supports the pawl 1575, from an extension of an arm 1578 pivoted on the stud 1573, to release said arm to the action of a spring 1579, which is tensioned between said arm and the arm 1572. This causes said arm 1578 to move in unison with the arm 1572, to withdraw a stud 1580 carried thereby from an extension 1581 of an arm 1582 free on the stud 1573, to release said arm to the action of the spring 1574, which is tensioned between said arm and the arm 1572. Counter-clockwise movement of the arm 1582, under influence of the spring 1574, moves a foot-shaped extension 1583 thereof into the path of a corresponding bushing 1584, free on the right trunnion bushing 1442 (Figs. 15 and 22), to cause said extension to yieldingly engage said bushing 1584 when the platen roll 309 is in open throat position, to maintain said bushing 1442 in contact with the curved surfaces formed by bent-over portions of the right plate 1569 (Fig. 14) to accurately locate and retain the platen roll 309 in front feeding position. Counter-clockwise movement of the arm 1582 (Fig. 22) is limited by an extension 1585 thereof in cooperation with one of the studs 1561.

When the platen roll 309 is in front feeding position, as shown in Figs. 17 and 21, the curled forward edge of the guide plate 1551 is in alinement with an angular ridge 1589, formed on the inside surface of a transparent strip 1590, and the inside surfaces of said plate and said strip form a front-feed throat 1591 for the ready removal and insertion of the statement slip 1550. The transparent guide strip 1590 (Fig. 18) is secured to a supporting bar 1592, which is in turn secured to the inside surfaces of the plates 1076 and 1077 (Fig. 33). The statement slip 1550 is inserted into the open throat 1591 and is pushed directly to proper position, the upper surfaces of the guide plate 1551 and the table 1552 properly guiding said statement slip around the platen roll 309. The line on the statement slip 1550 upon which it is desired to print is alined with the upper edge of the transparent strip 1590, which serves as a line-finding device to locate the desired line in proper relationship to the printing mechanism.

After the statement slip 1550 has been properly inserted into the open throat 1591, depression of the Carriage key 1072 (Figs. 3, 4, 5-A, and 5-B) or depression of any one of the amount keys 218 or any one of the item counting keys 343 renders the platen shifting mechanism effective to cause the platen roll 309 to be rocked from open throat position to printing position, in the manner explained earlier herein.

Initial counter-clockwise movement of the arm 1448 (Figs. 14, 15, 21, and 22), to shift the platen roll 309 from open throat position to printing position, causes a forward surface on the projection 1570 of said arm, in cooperation with a stud 1586 in a downward extension of the arm 1578, to rock said arm clockwise against the action of the spring 1579 to cause a stud 1587, carried by said arm, to engage and rock the pawl 1575 out of engagement with the stud 1576. This frees the arm 1572 to the action of the springs 1574 and 1579, which immediately rock said arm 1572 clockwise to withdraw its forward extensions from the stud 1557 to release the arms 1553, the table 1552, and the guide plate 1551 to the action of the springs 1556, which immediately rock said parts clockwise to move the curled-over forward edge of said guide plate 1551 into resilient engagement with the statement slip 1550 and the surface of the platen roll 309 to firmly hold said statement slip against displacement while the platen roll 309 is moving from front feeding position to printing position to insure that the desired line of said statement slip will be alined with the printing mechanism.

The above-described statement slip holding movement of the guide plate 1551 occurs before any return movement has been imparted to the platen roll 309 and while the studs 1447 are moving idly in the slots in the cranks 1446.

Continued clockwise movement of the arm 1573 (Fig. 22), under influence of the projection 1570 and the stud 1586, causes the stud 1580 to engage the extension 1581 to rock the arm 1582 clockwise against the action of the spring 1574. Clockwise movement of the arm 1582 disengages its foot-shaped extension 1583 from the bushing 1584, to free the platen roll 309 for movement from open throat position to printing position.

As the right arm 1448 nears the terminus of its counter-clockwise movement, the arcuate surface on the extension 1567 (Fig. 15) moves beyond the stud 1566 to free the arm 1558 to the action of the spring 1568, which rocks said arm clockwise into resilient engagement with the stud 1557. Simultaneously a finished surface on the forward end of the right arm 1594, secured on the right arm 1452 (Figs. 14 and 16), engages the stud 1577 to rock the arm 1553, the table 1552, and the guide plate 1551 counter-clockwise to move the curled-over forward edge of said guide plate out of engagement with the statement slip 1550 and the surface of the platen roll 309, after the spring-actuated pressure rollers 1563 have engaged said statement slip. As the stud 1557, under influence of the arm 1594, by-passes the forward extension of the arm 1558, said forward extension is spring-urged into the path of said stud to latch the platen roll 309 in printing position.

Without the arm 1558 to latch the platen roll 309 in printing position, it is possible that, when the periphery of the cam 1469 (Fig. 29) moves beyond the roller 1467, the slide 1457 and connected parts may shift out of position, under influence of the spring 1556 (Figs. 16 and 21), sufficiently to permit the guide plate 1551 to move into engagement with the statement slip 1550 and to permit the platen roll 309 to shift out of printing position. However, said arm 1558, in cooperation with the stud 1557, eliminates the possibility of such an occurrence.

*Platen rotating or line spacing mechanism*

By referring to Figs. 31 and 33, it will be recalled that the platen roll 309 has a wooden core 1441 with a central bore therein which receives tenons on the trunnion bushings 1442, said bushings having flanges which are secured to the ends of the wooden core by means of screws. The outside circumference of the trunnion bushings 1442 support the platen roll 309 for rotating or line spacing movement and likewise for movement to and from printing position, and likewise support certain of the mechanism shown in Figs. 14 and 15 and explained earlier herein for controlling the movement of the platen roll to and from printing position. The central bores in the bushings 1442 are in axial alinement and support a rod 1665, which is secured against displacement by a set screw 1666 (Fig. 33), which likewise secures a right-hand knob 1667, for manually rotating the platen roll, to the bushing 1442. There is a left-hand knob 1668 (Figs. 31 and 33) similar to the right-hand knob for manually rotating the platen roll 309, and this knob is secured to a sleeve 1669, which is slidably supported by the rod 1665 and is connected to the left-hand trunnion bushing 1442 by means of tenons thereon in cooperation with clutch cuts in said trunnion bushing 1442. A set screw 1670 (Fig. 31), threaded in the knob 1668, has a tenon which engages an annular groove in the rod 1665. A compression spring 1671, compressed between a head on the left-hand end of the rod 1665 and the end of the sleeve 1669, urges said sleeve and the knob 1668 toward the right, as viewed here, to normally render a clutch mechanism for clutching a platen roll feeding ratchet 1672 to the sleeve 1669 for rotation in unison therewith to render the means for automatically line-spacing the platen roll 309 effective. The feed ratchet 1672 is free on the outside circumference of the sleeve 1669 and has integral therewith a drum-shaped portion 1673 having a knurled interior circumference which cooperates with a knurled roller 1674 mounted in a slot in a disk 1675 connected to the sleeve 1669 for rotation in unison therewith by means of an angular flat portion of said sleeve, in cooperation with a wedge block 1676, said wedge block freely engaging a slot in said disk 1675.

Normally the spring 1671 urges the knob 1668 and the sleeve 1669 toward the right, causing the angular flat surface on said sleeve, in cooperation with the wedge block 1676, to shift the knurled roller 1674 upwardy to engage the knurls thereof with the corresponding knurls in the interior circumference of the drum 1673, to clutch said drum 1673 and the feeding ratchet 1672 to the sleeve 1669, which, it will be recalled, is connected to the trunnion bushing 1442.

In case it is desirable to disconnect the platen roll 309 from the feeding ratchet 1672, in order to adjust record material in relation to the printing line, moving the knob 1668 outwardly against the action of the spring 1671 retracts the angular flat surface on the sleeve 1669 from the wedge 1676 to permit said wedge and the knurled roller 1674 to shift downwardly to disengage the knurled teeth of said roller from the knurled teeth on the inside circumference of the drum 1673, to disconnect the feed ratchet 1672 from the platen roll 309, so that said roll may be revolved independently thereof to adjust the record material in relation to the printing line and the platen roll line spacing mechanism.

Mechanism cooperating with the ratchet 1672 and disclosed in Figs. 25, 26, and 27 is provided for automatically rotating the platen roll 309 to line-space the record material supported thereby.

A ratchet retaining pawl 1677 is pivotally mounted on a stud 1678 secured in a left-hand arm 1603 (Figs. 31 and 33), and a spring 1679 urges said retaining pawl clockwise to normally maintain a stud 1680, secured therein, in contact with the teeth of the ratchet 1672, to retain said ratchet and the platen roll 309 in line-spaced position. The stud 1680 permits rotation of the ratchet 1672 in either direction. A ratchet feed pawl 1681 is pivotally mounted on a stud 1682 secured in a feed pawl operating arm 1683 having a hub free on the left bushing 1442. A spring 1684, tensioned between the pawl 1681 and a stud 1684 carried by the same member as the arm 1683, urges said pawl clockwise to cause a tooth 1685 thereon to engage the teeth of the ratchet 1672 when the arm 1683 is rocked back and forth, as will be explained presently. The stud 1682 pivotally supports the forward end of a link 1686, the rearward end of which is pivotally supported by a stud 1687 secured in a crank 1688 connected by a hub 1689 to a companion arm 1690, said hub being pivotally mounted on a stud 1691 secured in the plate 1075. The lower end of the arm 1690 is slotted to embrace a stud 1692 secured in a left-hand arm 1693 free on a left-hand stud 1694 extending between the plates 1075 and 1077 (Fig. 33) and connected by a bail 1695 to a companion right-hand arm 1693 rotatably supported on a right-hand stud 1694 extending between the plates 1074 and 1076. A spring 1696 urges the arm 1693 and the bail 1695 counter-clockwise to normally maintain the upper end of the left-hand arm 1693 in contact with a bent-over ear 1697 formed on a plate 1698 secured to the plate 1075.

The rearward edge of the bail 1695 (Figs. 25 and 28) is curled over to form a rounded external surface, which cooperates with a bent-up extension 1700 on a line-spacing slide 1701 slidably mounted by means of parallel slots therein (Figs. 12-A and 12-B) in cooperation with the screw studs 1458, said slide 1701 being mounted immediately above the slide 1457 and separated therefrom by washers on the screw studs 1458. The slide 1701 has a downward extension with a slot 1702, which engages a stud 1703 in the upper end of a crank 1704 secured to a stud 1705 journaled in a boring in the frame 1087. An extension of the crank 1704 is slotted to receive a stud 1706 in an arm 1707 secured on one end of a sleeve 1708 free on the rod 1165. Secured on the other end of the sleeve 1708 is a V-shaped lever 1709 carrying rollers 1710 and 1711, which cooperate, respectively, with the peripheries of companion plate cams 1712 and 1713, which, together with a locating disk, are secured in fixed relationship to each other on a sleeve 1714 free on the shaft 1153. Also secured to the sleeve 1714 (Fig. 12-B) is a clutch driven member 1715 having teeth which cooperate with a clutch driving member 1716 connected by tenons and clutch cuts to a sleeve secured to the shaft 1153, so that said clutch driving member rotates in unison with said shaft while it is free to shift laterally thereon. The clutch driving member 1716 is actuated by a yoke 1717 in turn controlled by a latch member secured on a shaft 1718 rotatably mounted in the frame 1087 and the right-hand top plate 1136, said shaft also having secured thereto an arm 1719 urged clockwise by a spring to normally maintain the latch in engagement with the yoke 1717. The arm 1719 is connected by a link 1720 to a crank 1721 secured on a shaft 1722 journaled in extensions of the frame 1087. Secured on the right-hand end of the shaft 1722 is a crank 1723 connected by a link 1724 (Figs. 2, 5-A, and 5-B) to a lever 1725 free on the stud 1498. The lower end of the lever 1725 is slotted to receive a stud in the upper end of a lever 1726 free on the stud 1501, said lever 1726 being pivotally connected by a link 1727 to the lower end of a lever 1728 free on the stud 161. The link 1727 (Figs. 2 and 5-A) has an upward extension 1729, which cooperates with a stud 1730 in a plate 1731 free on the stud 1508 and pivotally connected by a link 1732 to a lever 1733 free on the shaft 1512. The forward end of the lever 1733 is pivotally connected to a bent-over portion of the stem of the Paper feed key 1073 (see also Figs. 1 and 3). A spring 1734 urges the plate 1731 counter-clockwise, which, through the link 1732 and the lever 1733, maintains the key 1073 normally in undepressed position. Depression of the Paper feed key 1073 (Figs. 1, 2, 3, 5-A, 5-B, and 12-B) rocks the plate 1731 clockwise against the action of the springs 1734, causing the stud 1730, in cooperation with the extension 1729, to shift the link 1727 forwardly. Forward movement of the link 1727, through the levers 1726 and 1725, also shifts the link 1724 forwardly to rock the crank 1723 (Fig. 5-B), the shaft 1722, and the crank 1721 clockwise. Clockwise movement of the crank 1721, through the link 1720, rocks the arm 1719 and the shaft 1718 counterclockwise, as viewed in Fig. 12-B, to disengage the latch from the yoke 1717 to cause said yoke to engage the clutch driving member 1716 with the clutch driven member 1715 to cause the cams 1712 and 1713 (Fig. 28) to be driven one clockwise revolution, after which the clutch mechanism is automatically disengaged.

Revolution of the cams 1712 and 1713 (Fig. 28), through the train of mechanism shown here, shifts the slide 1701 first forwardly and then back to normal position. Forward movement of the slide 1701 (Figs. 12-A, 12-B, 25, and 33), through its upward extension 1700, in cooperation with the rounded portion of the bail 1695, rocks said bail and the arm 1693 first clockwise, which movement, through the stud 1692, the arm 1690, the crank 1688, and the link 1686, rocks the arm 1683 also clockwise. Clockwise movement of the arm 1683 causes the tooth 1685 of the pawl 1681, under action of the spring 1684, to engage the teeth of the ratchet 1672 to revolve the platen roll 309 counter-clockwise to line-space the record material wound therearound.

In addition to the Paper feed key 1073, other mechanism controlled by the traveling carriage in predetermined columnar positions thereof and by the machine release bars is provided for causing the paper feeding mechanism to function in the manner outlined above, and such mechanism will be explained later.

Return movement rearward of the slide 1701 (Fig. 25) permits the spring 1696 to return the arms 1693, the bail 1695, and connected parts, including the arm 1683 and the pawl 1681, counter-clockwise or in a take-up direction, in preparation for the next paper feeding operation.

*Line-spacing control*

A cam mechanism is provided for controlling the engaging of the tooth 1685 (Fig. 25) of the pawl 1681 with the teeth of the ratchet 1672 to determine whether the platen roll 309 and the record material supported thereby will be advanced one, two, or three line spaces.

Directing attention to Figs. 25, 26, and 27, the ratchet feed pawl 1681 has a stud 1736, which cooperates with an arcuate surface 1737 on a plate 1738 having a hub free on the hub for the arm 1683, said plate having, in an extension thereof, three locating notches 1739, which cooperate with a stud 1740 in a retaining pawl 1741 free on a stud 1742 in the left-hand arm 1693

(Figs. 14 and 33) and urged clockwise by a spring 1743 to normally maintain said stud in yielding engagement with said locating notches. A link 1744 pivotally connects the plate 1738 to a lever 1745 free on the left-hand stud 1694 and having a fingerpiece 1746, which extends through an opening in a left-hand cover plate 1633.

When the arm 1683 and the pawl 1681 are in their take-up positions, as shown here, the arcuate surface 1737, in cooperation with the stud 1736, maintains the tooth 1685 of said pawl out of engagement with the teeth in the ratchet 1672. When the lever 1745 and the plate 1738 are in the position shown in full lines in Fig. 27, clockwise feeding movement of the pawl 1681 causes the stud 1736 to ride off of the arcuate surface 1737 at the earliest possible time and, in so doing, causes the tooth 1685 to engage the teeth of the ratchet 1672 sufficiently early so that continued clockwise movement of said pawl 1681 advances the ratchet 1672 and the platen 309 the equivalent of three ratchet teeth to triple-space the record material. Moving the lever 1745 and the plate 1738 one step clockwise, as shown in dot-and-dash lines in Fig. 27, causes the arcuate surface 1737 on said plate to delay the engaging of the tooth of the pawl 1681 with the ratchet 1672 sufficiently so that clockwise movement of said pawl will advance said ratchet and the platen roll the equivalent of two ratchet teeth to double-space the record material. Moving the lever 1745 and the plate 1738 another step clockwise, as shown in dot-and-dash lines in Fig. 27, causes the arcuate surface 1737, in cooperation with the stud 1736, to further delay engaging movement of the tooth of the pawl 1681 so that full clockwise movement of said pawl will advance the ratchet 1672 and the platen roll 309 the equivalent of one ratchet tooth to single-space the record material supported thereby.

When the feed pawl 1681 reaches the terminus of its feeding movement in a clockwise direction, as shown in Fig. 26, the stud 1736, in cooperation with an extended finger 1747 on the retaining pawl 1677, locks said pawl and the stud 1680 against ratcheting movement to in turn cause said stud to lock the ratchet 1672 and the platen roll 309 to insure accurate line-spacing of said ratchet and to prevent overthrow in case of fast operations of the paper feeding mechanism.

The right-hand trunnion bushing 1442 (Figs. 23, 24, and 33) and the sleeve 1669 extend through corresponding openings 1748 in the right- and left-hand plates 1074 and 1075 and through corresponding curved slots 1749 in right-hand and left-hand cover plates 1632 and 1634, said slots permitting the platen roll 309 to move from printing position to front feeding position and vice versa.

Shiftable shutters are provided for substantially closing the slots 1749 when the platen roll 309 is in either of its moved positions, thereby preventing the insertion of foreign objects into the slots with the resultant danger of injury to the person or to the mechanism of the traveling carriage.

Inasmuch as the mechanism is duplicated for each side of the traveling carriage, the mechanism for closing the slot 1749 on the right-hand side of the traveling carriage will be described.

The right-hand slot 1749 is adapted to be substantially closed by segmental shutters 1750 and 1751 frictionally connected to the upper end of a bell crank 1752 free on a stud 1753 secured in the right-hand plate 1074. A spring 1754 urges the bell crank 1752 counter-clockwise to normally maintain a concave forward surface on the segment 1751 in contact with a similar convex surface formed on the forward edge of the slot 1749.

When the platen roll 309 is in printing position, as shown in Fig. 23, the upper end of the segment 1750 closes the upper end of the opening 1748, and the segment 1751 closes the central portion of said opening, thereby substantially closing the entire slot against the introduction of foreign objects, except that portion of the slot through which the trunnion bushing 1742 extends. When the platen roll 309 moves from printing position to front feeding position, as shown in Fig. 24, the trunnion bushing 1442 simply pushes the shutter segments 1751 and 1750 out of the path thereof, rocking the bell crank 1752 clockwise against the action of the spring 1754. Likewise, the bushing 1442, when the platen roll is moving from printing position to front feeding position, engages the upper end of the segmental shutter 1750 and rocks said shutter clockwise, so that the lower end thereof covers the lower portion of the slot 1749 not covered by the shutter 1751.

*Line spacing control by release bars*

The main Release bar 170 and the Vertical feed bar 171 (Figs. 1 and 3), in addition to initiating operation of the machine, are arranged to control the line-spacing movement or rotation of the platen roll 309. The control of the line-spacing movement of the platen roll, under influence of the bars 170 and 171, may be varied by means of a sensing mechanism which cooperates with mutilated control segments in turn positioned in relation to said sensing mechanism by the manipulative slide 1808 (Figs. 1, 3, and 35).

The slide 1808 is slidably mounted on the amount keyboard top plate 188 by means of a bottom plate 1810, which is spaced slightly more than the thickness of said top plate 188 from the bottom surface of said slide 1808 by a spacer 1811, said plate 1810 and said spacer being secured by screws to the slide 1808. As presently arranged, the slide 1808 has four control positions in which it may be located and retained by a spring locating member 1812 secured to the bottom surface of the plate 188, said locating member having an embossed spherical projection which engages any one of four countersunk holes in the plate 1810, said holes corresponding to the four positions of the slide 1808. A downward extension 1809 of the bottom plate 1810 has a slot which engages a stud 1813 in a crank 1814 secured on the left-hand end of a short shaft 1815 journaled in a central bore in a stationary stud 177. Secured on the right-hand end of the shaft 1815 (Fig. 35) is a gear sector 1816, which meshes with a companion sector 1817 free on a stud 161 and having secured thereto arms 1818 and 1819, which are properly spaced from said sector 1817 by two spacers and secured in fixed relationship thereto by two screw studs 1820, which also support the spacers. The arms 1818 and 1819 have secured to their upper ends control segments 1821 and 1822. The segments 1821 and 1822 are secured to their respective arms 1818 and 1819 by screws, so that said segments may be removed and replaced by segments having different control surfaces, if desired.

The mutilated periphery of the segment 1821 cooperates with sensing studs 1823 and 1824 (Figs. 36 and 37) secured in symmetrical extensions of a sensing member 1825, and the mutilated periphery of the control segment 1822 cooperates with sensing studs 1826 and 1827 secured in symmetrical extensions of a sensing member 1828 (Fig. 34). The member 1825 (Figs. 36 and 37) is pivotally supported by a stud 1829 in an arm 1830 free on a stud 1831 extending between plates 168 and 1396 (Fig. 5-A). The arm 1830 is connected by a link 1832 to an arm 1833 free on a stud 166 (Fig. 36), said arm having an upward extension which is normally maintained in contact with a stud 1834 in an arm 1835, also free on the stud 166, by a torsion spring 1836 tensioned between said arms. The arm 1835 has a slot 1837, which cooperates with a stud 1838 in the lower stem portion of the Vertical feed bar 171.

Normal depression of the Vertical feed bar 171 causes the stud 1838, in cooperation with the lower surface of the slot 1837, to rock the arms 1835 and 1833 counter-clockwise, which movement, by means of the link 1832, is imparted to the arm 1830. Counter-clockwise movement of the arm 1830 causes the sensing member 1825 to sense for high and low spots on the periphery of the control segment 1821, and, if said segment is so positioned by the slide 1808 (Fig. 35) that a low portion of its periphery is opposite the stud 1823 and a high portion of said periphery is opposite the stud 1824, as shown in Figs. 35 and 36, counter-clockwise movement of the arm 1830 causes the stud 1823 to be moved downwardly into the low portion of the periphery of said segment 1821. As the stud 1824 is held against movement by the high portion of the periphery of the segment 1821, the member 1825 moves clockwise, causing the right-hand one of symmetrical extensions on its upper edge to engage a stud 1839 in an arm 1840 free on the stud 1831 and rock said arm counter-clockwise against the action of a spring 1806.

Figure 2:
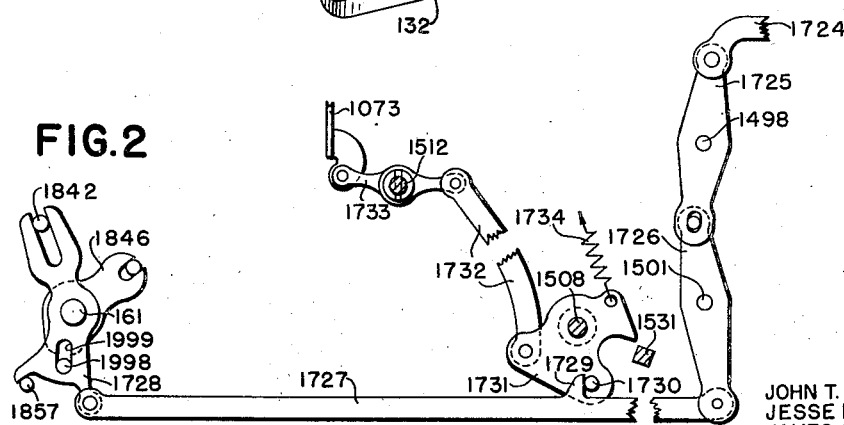
Fig. 2 is a detail view of a portion of the mechanism for controlling the line-spacing function of the platen roll.

The arm 1840 (Figs. 34 and 36) has pivotally connected thereto the upper end of a bar 1841 carrying a stud 1842 in its lower end, which engages a slot 1843 in the lever 1728, which, it will be recalled by referring to Figs. 2, 5-A, 5-B, and 12-B, is operatively connected to the clutch mechanism for driving the cams 1712 and 1713 (Fig. 28) for imparting line-spacing movement to the platen roll 309. The slot 1843 coincides with a similar slot in an arm 1844 connected by a hub 1845, free on the stud 161, to a companion arm 1846 slotted to receive a stud 1847 in a vertical feed actuator 1848 free on a stud 1422 and urged counter-clockwise by a spring 1849 to normally maintain a bent-over ear 1850 thereof in engagement with the shoulder of a latch 1851 free on a stud 1426 and urged counter-clockwise by a spring 1852 into engagement with said ear 1850. Counter-clockwise movement of the arm 1840 (Figs. 34 and 36) shifts the bar 1841 and the stud 1842 downwardly to move said stud into engagement with the slot in the arm 1844 to connect said arm to the lever 1728 for unitary operating movement.

With the parts in the positions described above, operation of the machine and resultant counter-clockwise revolution of the main cam shaft 216 (Figs. 5-A and 34) causes a node 1854 on a tripping cam 1855 secured on the sleeve 448, which, it will be recalled, also has secured thereto the cams 1430 and 447 and the plates 1528 and 2525 (Fig. 5-A), to disengage the latch 1851 from the ear 1850 immediately after printing has been effected. Disengagement of the latch 1851 releases the actuator 1848 to the action of the spring 1849, which immediately rocks said actuator counter-clockwise, which, by means of the stud 1847, rocks the arms 1846 and 1844 and, through the stud 1842, the lever 1728 clockwise. Clockwise movement of the lever 1728 (Figs. 2, 5-A, 5-B, 12-B, and 34), through the link 1727, the levers 1726 and 1725, the link 1724, and the crank 1723, rocks the shaft 1722 to render the clutch mechanism for the line-spacing mechanism effective to cause the platen roll to be revolved to line-space the record material supported thereby in exactly the same manner as explained in connection with the Paper feed key 1073 (Figs. 2 and 3).

Near the end of machine operation, a roller 1431 on the cam 1430 (Fig. 36) engages a rounded nose 1856 on the actuator 1848 and restores said actuator clockwise until the shoulder on the latch 1851 latches over the ear 1850 to retain said lever and connected parts in normal or restored positions. Normal position of the lever 1728 (Fig. 2) and connected parts is determined by a downward extension of said lever in cooperation with a stud 1857.

Full depression of the Vertical feed release bar 171 (Fig. 36) and retention of said bar fully depressed cause a stud 1440 therein to engage an extension 1858 of the arm 1830 and rock said arm clockwise against the action of the spring 1836 to restore the sensing member 1825 upwardly to normal position, which in turn restores the bar 1841 (Figs. 34 and 36) upwardly to uncouple the lever 1728 from the arm 1844, to prevent operation of the line-spacing mechanism under influence of the Vertical feed bar 171.

By referring to Figs. 36 and 37, it will be noted that the periphery of the control segment 1821 is undercut in relation to the sensing stud 1823 corresponding to positions 1, 2, and 3 of the control slide 1808 (Fig. 5). Therefore, when said control slide is in either 1, 2, or 3 position and the Vertical feed release bar 171 is normally depressed, automatic line-spacing of the platen roll 309 will result. When the slide 1808 is in position 4, a high portion of the periphery of the segment 1821 is opposite the stud 1823 to obstruct downward movement of the member 1825 and the bar 1841, and, as a result, the platen roll 309 is not rotated for line-spacing movement. By referring to Fig. 36, it will be noted that the stud 1839 in the arm 1840 extends through a clearance hole or opening in the arm 1830. A stop stud 1859 (Figs. 5-A and 36), secured in an auxiliary plate 1860 in turn secured to the front plate 1396, is engaged by a flat surface in the center of the sensing member 1825, under influence of the spring 1806, to determine the normal positions of said member, the arms 1830 and 1840, and the bar 1841.

The sensing member 1828 (Figs. 20, 34, and 39) is pivotally supported by a stud 1861 in an arm 1862 free on a stud 1413 and connected by a stud 1863 to an arm 1864 also free on said stud 1413. The arm 1864 (Fig. 20) is yieldingly connected, by a torsion spring 1865, to a companion arm 1866 free on the stud 1413, said torsion spring retaining an upward extension of said arm 1866 normally in engagement with a left-hand extension of the stud 1863. The arm 1866 has a slot 1867, which straddles a stud 1439 in the stem portion of the main Release bar 170.

When the control slide 1808 (Fig. 35) is in 3 position, an undercut portion of the periphery of the control segment 1822 is opposite the stud 1826, and, upon normal depression of the Release bar 170 (Fig. 20), the stud 1439, in cooperation with the lower surface of the slot 1867, rocks the arm 1866 and, through the spring 1865, the arm 1864 (Figs. 34 and 39) clockwise, as viewed here. The arm 1864, through the stud 1863, rocks the arm 1862 in unison therewith.

Inasmuch as a high portion of the periphery of the segment 1822 is opposite the stud 1827 and an undercut portion of said periphery is opposite the stud 1826, clockwise movement of the arm 1862 causes the sensing member 1828 to rock clockwise or downwardly, and, as a right-hand extension of said member overlies the stud 1839, the arm 1840 is simultaneously rocked counter-clockwise against the action of the spring 1806 to move the stud 1842 into engagement with the slot in the arm 1844 to connect said arm to the lever 1728 in the manner previously explained, to cause the platen roll to be automatically rotated to line-space the record material wound therearound.

When the operation of the machine is initiated by any one of the motorized keys 369, 376, 377, 278, and 379 (Figs. 11 and 38), the sensing member 1828 is rendered operative and, depending upon the position of the control slide 1808, causes the platen roll 309 to be line-spaced.

Referring to Fig. 11, it will be seen that the control keys 376, 377, 378, and 379 have pins 413, which cooperate with angular camming surfaces in openings in a control plate 1756 mounted for horizontal shifting movement by means of rollers on four stationary studs 416 secured in a plate 399, which, together with a companion plate 398, forms a framework for supporting the keys 374 to 381 inclusive of the control bank and for supporting the keys 369 to 372 inclusive (Figs. 3 and 38) of the correction bank.

The Correction keys 369 (Figs. 3 and 38) carry pins 410, which cooperate with angular camming surfaces 1761 in openings in a control plate 1760 mounted for horizontal shifting movement in exactly the same manner as the control plate 1756 (Fig. 11). The control plates 1756 and 1760 (Figs. 11 and 38) are connected for concert movement by means of gear teeth in their upper edges, in cooperation with corresponding segmental pinions 1757 and 1755 secured on opposite ends of a short shaft 1758 journaled in the plates 398 and 399.

From the foregoing it is evident that depression of any of the control keys 376, 377, 378, or 379, or depression of any of the Correction keys 369 (Figs. 11 and 38) shifts the control plates 1756 and 1760 forwardly in unison.

The control plate 1760 (Fig. 38) has in its forward end a stud 1885, which engages a slot in the upper end of a lever 1886 free on a stud 1887 secured in the plate 398. The lower end of the lever 1886 is slotted to receive a stud 1888 secured in the upper end of a crank 1889 in turn fast on the left-hand end of a shaft 1890, opposite ends of which are journaled in the plate 398 and an extension of the right frame 130 (Fig. 5-A). Secured on the right-hand end of the shaft 1890 is a crank 1891 carrying a stud 1892 engaged by a slot in the lower end of a lever 1893 free on a stud 1894 secured in a forward extension of a plate 1396 (Fig. 5-A) secured to the machine base 132. The upper end of the lever 1893 (Figs. 5-A, 37, 38, and 39) carries a stud 1895, which engages similar arcuate slots 1896 and 1897 in arms 1898 and 1899, the lower ends of which arms are slotted to embrace the stud 1413.

Normally a notch 1900 (Fig. 39) in the arm 1898 engages a stud 1901 in the arm 1862, and a notch 1902 (Fig. 37) in the arm 1899 normally engages a stud 1903 secured in the upper end of an arm 1904 free on the stud 1413. A downward extension of the arm 1904 carries a stud 1905 (Fig. 38) adapted to be engaged by an extension of an arm 1795 free on a stationary stud 1798, which arm 1795, through the medium of a link 1793 and a spring 1803, is rocked first counter-clockwise and back to normal position (Fig. 38) whenever the machine is released for operation by use of any of the motorized keys 376, 377, 378, and 379 (Fig. 11) or by use of any of the motorized keys 369 (Fig. 38) in the manner fully disclosed in the co-pending application of John T. Davidson et al., Serial No. 524,846, filed March 3, 1944, now Patent No. 2,442,402, June 1, 1948.

Depression of any one of the keys 376 to 379 inclusive, or any one of the keys 369 (Figs. 11 and 38), shifts the control plate 1760 forwardly, which movement, through the stud 1885, the lever 1886, the crank 1889, and the crank 1891, rocks the lever 1893 counter-clockwise, as viewed in Fig. 38. Counter-clockwise movement of the lever 1893, through the stud 1895, shifts the arms 1898 and 1899 (Figs. 37, 38, and 39) outwardly or forwardly to disengage the notch 1902 in the arm 1899 from the stud 1903, and simultaneously to engage the notch 1900 in the arm 1898 with said stud 1903. Initial counter-clockwise movement of the arm 1795 (Fig. 38), through the stud 1905, rocks the arm 1904 clockwise, causing the stud 1903, in cooperation with the slot 1900 and a stud 1901 in the arm 1862 (Figs. 34 and 39), to rock said arm 1862 clockwise in unison therewith. Clockwise movement of the arm 1862 causes the sensing member 1828 to move downwardly, whereupon the studs 1826 and 1827 therein (Figs. 34 and 39) sense the control surface of the segment 1822 in the manner previously explained.

If the slide 1808 (Fig. 35) is in No. 3 position, the segment 1822 (Figs. 34 and 39) will be so positioned that an undercut or low portion of its periphery is opposite the stud 1826 and a high portion of said periphery is opposite the stud 1827. Consequently the right-hand ear of the sensing member 1828 (Figs. 34 and 36) will engage the stud 1839 to rock the arm 1840 downwardly or counter-clockwise to cause the stud 1842 to engage the slot in the arm 1844 to in turn cause the platen roll 309 to be line-spaced in the manner explained earlier herein.

Upon full initial clockwise movement of the arm 1904 (Fig. 38) under influence of the arm 1795, as explained above, a square stud 1906 in a plate 1912, secured to said arm 1904, by-passes a shoulder on a retaining pawl 1907 free on a stud 1908 in the plate 1398 (Fig. 5-A). When the square stud 1906 by-passes the shoulder of the pawl 1907, a spring 1909, tensioned between said pawl and the plate 1912, causes the shoulder on said pawl to engage the stud to retain the arm 1904, 1898, and 1862 (Fig. 39) in their clockwise positions for a sufficient length of time for the sensing mechanism to function.

After the sensing mechanism has functioned as explained above, to cause the line-spacing mechanism to operate, a link 1415 (Fig. 38) is shifted rearwardly as explained in the co-pending application Serial No. 524,846, causing a stud 1911 therein to engage a protruding surface on the forward edge of the arm 1907 and rock said arm clockwise against the action of the spring 1909. Clockwise movement of the arm 1907 disengages the shoulder on its upper end from the stud 1906 to free the plate 1912 and the arm 1904 to the action of the spring 1909, which immediately rocks said parts and the arms 1898 and 1862 and the sensing member 1828 counter-clockwise to normal position.

Release of the depressed control key 376 to 379 inclusive, or the depressed correction key 369, permits the control plate 1768 (Fig. 38) to be spring-returned rearwardly, which, through the mechanism shown here, restores the arms 1898 and 1899 and connected mechanism downwardly to normal position.

*Control of line-spacing by traveling carriage*

A sensing lever 1925 (Figs. 12-B and 19), in cooperation with corresponding tappets 1917 carried by the control blocks 722, is arranged to control the automatic line-spacing movement of the platen roll 309, depending upon the columnar position of the traveling carriage.

The right-hand end of the sensing lever 1925 (Figs. 19 and 30) overlies a rearward extension of a lever 1991 free on a stationary stud 1964 and pivotally connected by a link 1992 to one arm of a bell crank 1993 free on a stud 1994 secured on the plate 1191 (Figs. 5-A and 12-B). A spring 2008 urges the lever 1991 counter-clockwise to normally maintain said lever in yielding engagement with the sensing lever 1925 (Fig. 12-B. A downwardly-extending arm of the bell crank 1993 has pivotally connected thereto the rearward end of a link 1995, the forward end of which is slotted to receive a stud 1996 in a lever 1997 free on the stud 1422. A forward extension of the lever 1997 has a slot which engages a stud 1998 in an arm 2000, having a slot which freely engages a hub of the lever 1728, said hub being free on the stud 161. The stud 1998 likewise extends through an arcuate slot 1999 in the lever 1728.

If the traveling carriage 136 is located in a columnar position in which no tappet 1917 is opposite a sensing projection 1931 of the lever 1925, said lever is free to move under influence of a spring-actuated mechanism upon the releasing of said lever 1925 for sensing movement. Sensing movement of the lever 1925 causes its right-hand extension to rock the lever 1991 clockwise, against the action of the spring 2008 (Fig. 30), which movement, through the link 1992 and the bell crank 1993, shifts the link 1995 forwardly, causing the slot in its forward end, in cooperation with the stud 1996, to rock the lever 1997 also clockwise. Clockwise movement of the lever 1997 causes the slot in its forward extension, in cooperation with the stud 1998, to shift said stud and the arm 2000 upwardly to engage said stud with a notch in a downward extension of the arm 1846 (Figs. 2, 30, and 36) to operatively connect the lever 1728 to said arm 1846 so that release of the actuator 1848 by the cam 1855, as explained earlier herein, immediately after printing has been effected, will cause the vertical feeding or line-spacing mechanism to become effective to rotate the platen roll 309 to line-space the record material wound therearound.

If the traveling carriage 136 is located in a columnar position in which one of the tappets 1917 (Fig. 19) is opposite the sensing projection 1931 of the lever 1925, sensing movement of said lever, as explained above, will be obstructed, and, as a result, the lever 1991 (Fig. 30) will be retained in the position shown here. Therefore no movement will be imparted to the lever 1997, and, as a result, the stud 1998 will remain out of engagement with the notch in the arm 1946 (Fig. 2). In this case, the line-spacing mechanism will not function.

When the main Release bar 170 (Figs. 5-A and 5-B) is fully depressed and is retained thus, a bar 1386 (Fig. 30) is shifted forwardly to cause the traveling carriage to be moved to the No. 2 Check column. The bar 1386 (Fig. 30) has a bent-over extension 2001, which cooperates with an upward extension 2002 of a bar 2003 mounted for independent shifting movement on the link 1995 by means of a hole in its forward end, which freely engages the stud 1996, and by means, of a slot in its rearward end, which embraces a stud 2004 in said bar 1995. A spring 2005, tensioned between the studs 2004 and 1996, urges the lever 1997 counter-clockwise and the bar 2003 rearwardly. Subsequent forward movement of the bar 1386, through the extensions 2001 and 2002 (Fig. 30), shifts the bar 2003 also forwardly against the action of the spring 2005, causing said bar to rock the lever 1997 clockwise in the manner explained previously to engage the stud 1998 (Fig. 2) with a notch in the arm 1846 to cause the platen roll 309 to be revolved to line-space the record material supported thereby, in exactly the same manner as explained previously.

*Mechanism to prevent automatic opening of front-feed throat*

Mechanism is provided for preventing automatic opening of the front-feed throat near the end of machine operation by the projection 2524 on the plate 2525 (Figs. 5-A and 5-B) in cooperation with the actuator lever 1504 and connected mechanism explained earlier herein. The right-hand end of a control lever 1924 (Figs. 5-A, 5-B, 12-B, and 19) overlies a rearward extension of a lever 1984 free on the stud 1964 and connected by a link 1985 to a crank 1986 secured on the left-hand end of a short shaft 1987 journaled in a bushing in the plate 1191. Secured on the right-hand end of the shaft 1987 is an arm 1988 having an upward extension adapted to move into the path of an extension of a stud 1989 secured in the upper end of the lever 1497, said stud also forming a pivot for the forward end of the link 1496.

When the traveling carriage 136 is in a columnar position in which the corresponding control block 722 contains one of the tappets 1916, said tappet, in cooperation with the projection 1931 of the lever 1924, obstructs sensing movement of said lever. In this case, the arm 1988 is retained in the position shown in Fig. 5-A, out of the path of the stud 1989, and consequently the mechanism functions to open the throat of the traveling carriage. If there is no tappet 1916 to obstruct sensing movement of the lever 1924, such movement of said lever rocks the lever 1984 clockwise, as viewed in Figs. 5-A and 5-B, against the action of a spring 2007, which, through the link 1985, rocks the crank 1986 and the arm 1988 also clockwise to move the hook-shaped upward extension of said arm 1988 into the path of the stud 1989 to obstruct counter-clockwise movement of the lever 1497 and thereby prevent operation of the throat opening mechanism under influence of the spring-moved actuator 1504.

It is therefore obvious from the foregoing description that it is possible to selectively control in which columnar position of the traveling carriage 136 the platen roll 309 will be automatically moved from printing position to front feeding position near the end of machine operation.

MODE OF OPERATION

The machine embodying the present invention has been arranged for use by banking establishments in the balancing of individual checking accounts. However, this is but a representative use of this machine, as its versatility and its many features make it easily adaptable for use in connection with many different business systems; therefore it is not desired to limit the machine to any one business system or to any particular use in connection with such systems.

The statement slip 1550, shown in Fig. 32, will be used as a basis in explaining one mode of operating the machine, said statement slip being for one individual checking account and issued in the name of John Doe, in account with Any Bank and Trust Company, Anywhere.

It will be noted that the statement slip is divided into a main portion and a stub portion, said portions being divided by perforations to facilitate their separation.

The main portion of the statement slip is divided into the following columns—a Pick-up column, three Check columns, a Deposit column, and a Sub-balance column. In addition, the main portion of the statement slip contains two Date columns, one of which is between the Pick-up column and the first Check column, and the other of which is between the Deposit column and the Sub-balance column, in which columns the dates are printed in connection with the recording of the first check item and the recording of the sub-balance.

The stub portion of the statement slip contains a Float column, in which the analysis of the float is recorded, a Date column, a Total item column, and a Balance column. The Date and the Total items are printed in connection with the recording of the balance in the Balance column.

In the right-hand upper margin of the main portion of the statement slip, definitions of the symbol keys 390 (Fig. 3) when used in connection with debit and/or credit items are listed.

In most banking establishments, it is the general practice to balance each active checking account daily, and the statement slips used in balancing such active accounts are usually of sufficient length to accommodate all of the entries over a certain period of time, generally a month, at the end of which time the stub portion of the statement slip is separated from the main portion thereof, the main portion being mailed to the depositor or customer and the stub portion being retained by the bank as a record.

Before the beginning of the daily posting of active checking accounts, the operator properly inserts a journal sheet with its superimposed carbon paper around the platen roll 309 (Fig. 1), said journal sheet being the full width of both the main portion and the stub portion of the statement slips for the reception of a duplicate recording of every entry made on the statement slips during the day's run.

Prior to the posting of individual checking accounts, all of the active statement slips are removed from the file and placed in a convenient stack or pile near the operator in alphabetical order. With the traveling carriage 136 (Fig. 1) in its extreme right-hand or Pick-up columnar position and with the platen roll 309 in open throat position, the operator removes the statement slip 1550 (Fig. 32) for John Doe from the top of the stack, places it in the open throat of the traveling carriage, locates the proper line of the statement slip with the printing mechanism by means of the line-finding device, and then operates the electrical switch, which starts the motor for the traveling carriage and the machine proper.

If this is the first entry to be made on John Doe's statement slip, the operator ascertains the old balance of $500.00 from the last entry on the stub portion of his previous statement slip and sets up said old balance of $500.00 on amount keys 218 (Fig. 3), depression of which amount keys causes the platen roll 309 to be moved from open throat position to printing position.

After the amount of the old balance, $500.00, has been set up on the amount keys, operation of the machine is initiated by normal depression of the main Release bar 170, during which operation the amount of the previous or old balance is recorded in the Pick-up column of the statement slip and is simultaneously added into the previously cleared No. 1 or balance totalizer. Normal depression of the Release bar 170 causes the traveling carriage to be tabulated from the Pick-up column to the next columnar position— that is, the first Check column—at the end of machine operation. Next, the operator sets up the amount of the first check item ($50.00) on the amount keys and, to identify this as a "debit memo" depresses the DM symbol key 390, after which operation of the machine is initiated by normal depression of the main Release bar 170. During operation of the machine, the amount of the first check, $50.00, is recorded in red in the first Check column, and the "DM" symbol is simultaneously recorded immediately to its right. At the same time, the amount of the check is subtracted from the balance of $500.00 in the balance totalizer.

It will be recalled that the ribbon controlling mechanism functions automatically to cause all debit items and all overdraft items to be printed in a distinctive color, such as red.

At the end of the first check posting operation, the traveling carriage 136 tabulates automatically to the second Check column, and the amount of the second check ($25.00) is set up on the amount keys and the machine is again released for operation by normal depression of the Release bar 170. During this second check operation, the amount of the check ($25.00) is subtracted from the balance totalizer and is simultaneously recorded in red in the second Check column. At the end of this operation, the traveling carriage again tabulates automatically one columnar position to the third Check column.

With the traveling carriage in the third Check columnar position, the amount of the third check ($175.00) is set up on the amount keys, and, as there is one more debit or check item to be posted, the operator initiates operation by normal depression of the Vertical feed bar 171. During this operation of the machine, the third check item ($175.00) is recorded in red in the third Check column and is simultaneously subtracted from the No. 1 or balance totalizer. At the end of the operation, the platen roll is rotated to line-space the record material in preparation for the entry of the fourth check item.

Next, the amount of the fourth check item ($50.00) is set up on the amount keys, and the machine is released for operation by normal depression of the Release bar 170. During this operation, the amount of the fourth check item ($50.00) is recorded in red in the third Check column, directly beneath the third check item, and is simultaneously subtracted from the balance totalizer. Near the end of machine operation, the traveling carriage 136 tabulates to the next or Deposit columnar position.

With the traveling carriage 136 in the Deposit columnar position, the amount of the deposit ($100.00) is set up on the amount keys, and the machine is released for operation by normal depression of the Release bar 170. During operation of the machine, the amount of the deposit ($100.00) is recorded in black in the Deposit column of the statement slip and is simultaneously added in the balance totalizer.

Near the end of the deposit operation, the traveling carriage 136 tabulates automatically to the next or Sub-balance column, in which an automatic operation of the machine is initiated by said traveling carriage. In this automatic operation, the balance totalizer is sub-totalized, and the sub-balance of $300.00 is recorded in black in the Sub-balance column. The sub-balance is identified as such by the symbol "*S," which is automatically printed at the time the sub-balance is printed. At the end of the sub-balance operation, the traveling carriage tabulates automatically to the Float columnar position.

With the traveling carriage located in the Float columnar position, the operator depresses the proper amount keys and initiates machine operation by normal depression of the Release bar 170. Upon operation of the machine, an analysis of the float is recorded in the Float column, and during this operation all of the totalizers are automatically non-added so that the machine will function at this time only as a printing machine.

At the end of the float operation, the traveling carriage tabulates automatically to the Balance column and, upon arrival in this position, said carriage initiates an automatic operation, during which the balance totalizer is totalized and the amount therein ($300.00) is recorded in black in the Balance column of the statement slip 1550, and simultaneously therewith the identifying symbol " * " is printed directly opposite said amount to identify it as a positive balance.

During the entering of the various check and deposit items, the automatic item-counting mechanism functions to add "1" in the item totalizer each time each item is recorded. However, when the traveling carriage is in other than the Balance columnar position, the hammers for the item-counting type carriers are locked against printing movement, so that the items will not be recorded as they are automatically entered in the item totalizer. When the traveling carriage 136 is in Balance columnar position, the printing hammers for the item type carriers are unlocked, and, during the balance operation, the item totalizer is totalized to record the total number of items, in this case 5, in the Total item column immediately to the left of the recording of the balance.

It will be noted that, during each posting operation, the date is printed three times, twice upon the main portion of the statement slip 1550 (Fig. 32) and once upon the stub portion of said slip. When the traveling carriage 136 is in the first Check columnar position, the printing hammers for the date type carriers are unlocked so that the date "April 12—43" is printed in the Date column immediately to the left of said first Check column simultaneously with the posting of the first check. In a like manner, the date "April 12—43" is printed simultaneously with the recording of the sub-balance and again with the recording of the balance.

Near the end of the balance operation, the traveling carriage 136 (Fig. 1) tabulates automatically a slight distance beyond the Balance columnar position to render mechanism effective which causes said carriage to be moved in a return direction to the Pick-up column and at the same time causes the platen roll 309 to be moved from printing position to open throat position, so that the statement slip may be readily removed and the next statement slip inserted in the front-feed throat of the machine. In all other columnar positions of the traveling carriage, the automatic throat opening mechanism is automatically locked against operation to avoid unnecessary opening and closing of the front-feed throat.

In posting or balancing John Doe's account for April 13, 1943, the operator picks up the previous or old balance ($300.00) from the last entry in the Balance column, sets this amount up on the amount keys, and releases the machine for operation by depressing the Release bar 170, in exactly the same manner as explained in connection with the former old balance of $500.00. The next two check items of $10.00 and $20.00, respectively, are entered in exactly the same manner as explained above, and, during the printing of the first check item of $10.00, the date, April 13—43, is simultaneously printed immediately to the left of the first Check column. After the second Check item of $20.00 has been entered in the machine and the traveling carriage 136 has tabulated to the third Check column, the operator sets up the amount of the third check item ($30.00) on the amount keys, and, as this is a non-count item—that is, not to be automatically accumulated in the item totalizer—the No-count key 371 (Fig. 3) is also depressed.

Inasmuch as there is no deposit item to be entered in this particular posting operation, it is desirable to have the traveling carriage 136 skip-tabulate from the third Check column to the Sub-balance column, and this is effected by initiating machine operation by fully depressing the Skip-tabulating bar 172 and retaining said bar depressed. During the machine operation, the amount of the third check ($30.00) is entered in the third Check column, and the symbol "NC" for the No-count key 371 is simultaneously recorded immediately to its right. At the end of machine operation, the traveling carriage skip-tabulates from the third Check column to the Sub-balance column, and, in an automatic operation of the machine, the amount of the balance, $240.00, the sub-balance symbol "*S," and the date "April 13—43" are recorded, after which the traveling carriage tabulates to the Float column.

The figures for the float analysis are now set up on the keyboard, the machine is released for operation, as explained above, and, after the analysis of the float has been recorded, the traveling carriage tabulates automatically to the Balance column, and in an automatic operation the No. 1 or balance totalizer is cleared and the amount therein of the new balance ($240.00) is recorded in said Balance column. Simultaneously with the recording of the new balance, the total amount of items (2) is recorded in the Total item column, and the date "April 13—43" is also recorded in the date section of the Balance column. As in the previous posting, the traveling carriage again tabulates automatically to the left to render the mechanism effective for causing the platen roll 309 to be moved from printing position to front feeding or open throat position and to cause said traveling carriage to be automatically returned to the Pick-up column.

In the posting of John Doe's account for April 14, 1943, the amount of the old balance ($240.00) is ascertained from the last entry in the Balance column and entered in the Pick-up column as before, after which the traveling carriage 136 tabulates to the first Check column position, and the first check item of $30.00 is recorded therein in the same manner as before. At the same time, the date is also recorded in the date section of the first Check column. Inasmuch as there are only two debit or check items to be entered at this particular posting, it is desirable that the traveling carriage skip-tabulate directly from the first Check column to the third Check column. This skip-tabulating is effected by initiating the operation in which the first check item of $30.00 is recorded, by full depression of the Vertical feed bar 171 and the retention of said bar depressed, which causes the traveling carriage to skip-tabulate from the first Check column to the third Check column, after the first check item has been recorded.

Next, the amount of the second debit item ($270.00), which in this case comprises 25 checks of a certain or particular classification, is set up on the keyboard. As this is a List Debit item, the LS symbol key 390 (Fig. 3) is simultaneously depressed, and the number of the checks (25) in this particular group is set up on the item-counting keys 343. As there is no deposit in this particular posting operation, it is desirable that the traveling carriage skip-tabulate from the third Check column to the Sub-balance column. This is effected, as before, by full depression of the Skip-tabulating bar 172 and by the retention of said bar depressed. During operation of the machine, the amount of the debit item ($270.00) is recorded in the third Check column, the symbol LS is simultaneously recorded immediately to its right, and the total number of items (25) is simultaneously added in the item totalizer.

Subtraction of the debit item of $270.00 from the balance totalizer creates an overdraft in said totalizer, and this sets up a condition which will cause the No. 5 or overdraft totalizer, which, it will be recalled, is always complementary to the balance totalizer, to be sub-totalized or totalized, as the case may be, in order to secure a positive recording of the amount of the overdraft. Likewise, the occurrence of an overdraft in the balance totalizer automatically sets up a condition which will cause the amount of the overdraft to be printed in red.

Near the end of the operation in which the debit item of $270.00 was posted, the traveling carriage skip-tabulates automatically from the third Check column directly to the Sub-balance column and in so doing initiates an automatic machine operation, during which the overdraft totalizer is sub-totalized and the positive amount of the overdraft ($60.00) is recorded in the Sub-balance column. The occurrence of an overdraft in the balance totalizer likewise sets up a condition which causes the identifying symbol "OD" to be recorded immediately to the right of the sub-balance, and, as in other sub-balance operations, the sub-balance symbol "S" is also recorded. Simultaneously with the recording of the sub-balance of the overdraft, the date is printed in the date section of the Sub-balance column.

Near the end of the sub-balance operation, the traveling carriage 136 tabulates to the Float column, and the analysis of the float is set up and recorded as before, after which the traveling carriage tabulates to the Balance column, and, in an automatic operation of the machine, the No. 5 or overdraft totalizer is cleared, the amount of the overdraft ($60.00) is recorded in red in the Balance column, and the identifying symbol "OD" is recorded immediately to the right thereof. Simultaneously with the recording of the overdraft, the item totalizer is cleared, and the total number of items (26) is cleared therefrom and recorded in the Total item column. At the end of the balance operation, the traveling carriage 136 is returned to the Pick-up column, and, at the same time, the platen roll 309 is moved from printing position to open throat position in preparation for the next sequence of posting operation.

In the posting or balancing of John Doe's account for April 15, 1943, the previous balance, which is an overdraft of $60.00, is set up on the amount keys, and machine operation is initiated by depression of the Subtract-1 or Overdraft pick-up key 377 (Fig. 3), and during machine operation the amount of the overdraft ($60.00) is subtracted from the No. 1 or balance totalizer and is simultaneously recorded in red in the Pick-up column. Use of the key 377 to initiate machine operations causes a minus symbol (—) to be printed immediately to the right of the amount of the overdraft, to further identify this as a negative amount.

At the end of machine operation, the traveling carriage tabulates to the first Check columnar position, and in subsequent item-entering operations the three check items of $10.00, $5.00, and $15.00 are recorded in red and simultaneously subtracted from the balance totalizer. Before initiating the third check-entering operation, the operator notices that there is a fourth debit item, and in this case the Vertical feed release bar 171 is used in initiating such machine operation. Normal depression of the Vertical feed bar 171 causes the platen roll 309 to be rotated near the end of machine operation to line-space the record material in preparation for the listing of the fourth debit item.

The fourth item, which is a bookkeeping or service charge of fifty cents, is set up on the amount keys; at the same time, the SC symbol key 390 is depressed, and the machine is released for operation by normal depression of the main Release bar 170. During machine operations, the amount of the service charge (50 cents) is recorded in red in the third Check column directly beneath the third Check item, and the symbol "SC" is simultaneously recorded immediately to the right thereof to identify this item as a service charge. Near the end of machine operation, the traveling carriage tabulates automatically to the Deposit column, after which the amount of the deposit ($200.00) is set up on the amount keyboard, and, as this is a credit memo item, the "CM" symbol key 390 is depressed, after which the Release bar 170 is depressed to initiate machine operation. During machine operation, the amount of the credit memo item is recorded in the Deposit column and is simultaneously added in the No. 1 or balance totalizer, and the symbol "CM" is simultaneously recorded immediately to the right of said credit memo item.

Near the end of the deposit operation, the traveling carriage 136 tabulates automatically to the Sub-balance column, and, in an automatic operation, the balance totalizer is sub-totalized and the amount therein ($109.50) is recorded in the Sub-balance column, and the symbol "*S," to identify this as a positive sub-balance item, is simultaneously recorded immediately to the right thereof.

At the end of the sub-balance operation, the traveling carriage 136 tabulates to the Float column as before, and the analysis of the float is entered in the manner explained above, after which said traveling carriage tabulates to the Balance column, and, in an automatic balancing operation, the balance totalizer is cleared, and the amount therein ($109.50) is recorded in the Balance column, and the positive balance symbol " * " is recorder simultaneously to the right thereof. Simultaneously with the recording of the balance, the No. 6 or item totalizer is cleared, and the amount of the item therein, in this case 5, is simultaneously recorded in the Total item column. Also during the recording of the balance, the date is simultaneously recorded in the date section of the Balance column.

It is believed that the above description of operation in connection with one particular business system will be sufficient for the purpose of the present specification. However, the many features and the versatility of the machine embodying this invention render it readily adaptable for use in connection with almost any type of business system used in connection with present-day business and manufacturing establishments. For example, the system set-up of the machine may be readily changed by the simple expedient of removing the control block bar 729 and substituting therefor another bar having the control blocks 722 arranged thereon to agree with the requirements of the new business system. Or, if desired, the control blocks 722 may be relocated on the bar 729 to adapt the machine for a different business set-up.

The adaptability of the machine to various business systems is further enhanced by the Control keys 374 to 380 inclusive (Fig. 3), the Correction keys 369 to 372 inclusive, the Column selecting keys, and the Carriage control keys. The adaptability of the machine to various business systems is likewise augmented by the three release bars 170, 171, and 172 and their controlling mechanisms.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described, having a traveling carriage, the combination of a platen roll mounted in the carriage for movement from working position to front feed position and vice versa; means to retain the platen roll in working position; means to retain the platen roll in front feed position; means to move the platen roll from working position to front feed position and vice versa; and means, including a member, to operatively connect the moving means to the platen roll, said member being adapted to control both of the retaining means to render them ineffective and effective at proper times as the platen roll is being moved from one position to another.

2. In a machine of the class described, having a traveling carriage, the combination of a platen roll mounted in the carriage for movement from working position to front feed position and vice versa; means to move the platen roll; means, including a member, to operatively connect the platen roll to the moving means; means controlled by the member to secure the platen roll in working position; and means controlled by the member to secure the platen roll in front feed position.

3. In a front feed traveling carriage, the combination of a platen roll rockably supported by the carriage for movement from working position to front feed position and vice versa; means to retain the platen roll in working position; means to retain the platen roll in front feed position; means to move the platen roll from working position to front feed position and vice versa; means, including a member located between the platen roll and the moving means, to operatively connect said parts; and means whereby the member, during its movement to move the platen roll to front feed position, renders the first retaining means ineffective and the second retaining means effective, and, during its movement to move the platen roll to working position, renders the second retaining means ineffective and the first retaining means effective.

4. In a machine of the class described, the combination of a traveling carriage arranged so that record material may be inserted and removed at the front thereof; a platen roll supported by the carriage for movement from a working position to front feed position and vice versa; means to retain the platen roll in working position; means to move the platen roll from working position to front feed position and vice versa; means, including a member, to connect the moving means to the platen roll, said member movable in initial direction to move the platen roll to front feed position, and movable in return direction to move the platen roll to working position; means to retain the platen roll in front feed position; means to control the latter retaining means; a part adapted to cooperate with the member during the movement of said member in initial direction to actuate the control means to cause the latter retaining means to be moved to effective position; means to latch the part in moved position; and means on the control means whereby the member during its return movement causes said control means to render the latch means ineffective and to simultaneously restore the latter retaining means to ineffective position.

5. In a machine of the class described, having a plurality of data-entering elements and a traveling carriage supporting a movable platen roll, the combination of means, including a slide, to move the platen roll from working position to front feeding position and vice-versa; means, including a cam, to actuate the slide and the moving means; power means; normally ineffective means to connect the power means to the cam for operation thereby; means to render the connecting means effective to cause the cam to actuate the slide to in turn cause the platen roll to be moved to front feeding position; and means operated by the elements and rendered operative by the slide, after said slide has been actuated, to again render the connecting means effective to cause the platen roll to be returned to working position.

6. In a machine of the class described having printing means, a plurality of item-entering elements to control the positioning of the printing means, a traveling carriage, and a platen roll supported by said carriage, said platen roll constructed and arranged to present record material to the printing means, the combination of means to mount the platen roll in the carriage for movement from printing position to a record material receiving position; means, including a slide coacting with the mounting means, to move the platen roll from printing position to front feeding position and vice versa; means, including a cam, to actuate the slide; power means; a normally ineffective clutch device between the power means and the cam for operatively connecting said power means and said cam; means to render the clutch device effective to cause the cam to actuate the slide to in turn cause the platen roll to be moved from printing position to front feeding position; and means rendered operative by the slide after said slide has been actuated, and operated by the elements to render the clutch device effective to cause the platen roll to be returned to printing position.

7. In a machine of the class described, having printing means, a plurality of item-entering elements to control the positioning of the printing means, and a platen roll for presenting record material to the printing means, the combination of means to mount the platen roll in the traveling carriage for movement from printing position to front feeding position and vice versa; means coacting with the mounting means to move the platen roll from one position to the other; a slide coacting with the moving means and shiftable in one direction to move the platen roll to front feeding position, said slide shiftable in the opposite direction to move the platen roll to printing position; means including a cam to shift the slide; continuously operating power means; a clutch device to connect the power means to the cam; means to engage the clutch device; means to render the engaging means effective to cause the slide to be shifted in said one direction to move the platen roll to front feeding position; means to disengage the clutch device after the slide has been shifted to said one position; and means operable only when the slide is in said one position, and controlled by operation of any one of the elements to render the engaging means effective to cause said slide to be shifted in said opposite direction to move the platen roll to printing position.

8. In a machine of the class described, having means for imparting cycles of operation to the machine and having a traveling carriage positionable in various columnar positions, said carriage supporting a platen roll for receiving record material, the combination of means to mount the platen roll in the carriage for movement from a working position to a front feeding position and vice versa; means cooperating with the mounting means to move the platen roll from one position to the other; means including a cam to actuate the moving means; power means; a clutch mechanism between the power means and the cam, said clutch mechanism engageable to connect said parts for concert operation; means to engage the clutch mechanism to cause the platen roll to be moved from one position to the other; means to disengage the clutch mechanism after the platen roll has completed movement from one position to the other; means rendered effective by the cycling means near the end of machine operation to actuate the clutch engaging means; manipulative means to actuate the clutch engaging means; and means controlled by the carriage in pre-selected columnar positions thereof to lock the clutch engaging means against actuation by either of the above actuating means.

9. In a machine of the class described, having means for imparting cycles of operation to the machine, and having a traveling carriage positionable in various columnar positions, said carriage supporting a movable platen roll for receiving record material, the combination of means to move the platen roll from a working position to a front feeding position and vice versa; means to actuate the moving means; a power means separate from the machine cycling means; a clutch mechanism to connect the power means to the actuating means; means to engage the clutch mechanism to cause the platen roll to be moved from one position to the other; means to disengage the clutch mechanism after the platen roll has completed movement from one position to the other; automatic means to actuate the clutch engaging means; manipulative means to actuate the clutch engaging means; and means controlled by the carriage in pre-selected columnar positions thereof to lock the clutch engaging means against actuation by either of the above actuating means.

JOHN T. DAVIDSON.
JESSE R. GANGER.
JAMES H. CRAWFORD.
HERMAN F. SADGEBURY.

REFERENCES CITED

The following references are of record in the file of this patent:

UNITED STATES PATENTS

| Number | Name | Date |
| --- | --- | --- |
| 1,236,850 | Lloyd | Aug. 14, 1917 |
| 1,973,036 | Becker | Sept. 11, 1934 |
| 2,138,482 | Davidson | Nov. 29, 1938 |
| 2,202,595 | Muller | May 28, 1940 |
| 2,288,916 | Muller | July 7, 1942 |